US006463460B1

(12) United States Patent
Simonoff

(10) Patent No.: US 6,463,460 B1
(45) Date of Patent: Oct. 8, 2002

(54) INTERACTIVE COMMUNICATION SYSTEM PERMITTING INCREASED COLLABORATION BETWEEN USERS

(75) Inventor: Adam J. Simonoff, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/296,802

(22) Filed: Apr. 23, 1999

(51) Int. Cl.[7] .............................................. G06F 15/16
(52) U.S. Cl. ...................... 709/203; 709/205; 345/335
(58) Field of Search ............................... 709/203, 205; 345/335

(56) References Cited

U.S. PATENT DOCUMENTS

| 4,974,173 | A | | 11/1990 | Stefik et al. | |
|---|---|---|---|---|---|
| 5,008,853 | A | | 4/1991 | Bly et al. | |
| 5,206,934 | A | | 4/1993 | Naef, III | |
| 5,317,683 | A | | 5/1994 | Hager et al. | |
| 5,379,374 | A | | 1/1995 | Ishizaki et al. | |
| 5,428,729 | A | | 6/1995 | Chang et al. | |
| 5,515,491 | A | | 5/1996 | Bates et al. | |
| 5,613,134 | A | | 3/1997 | Lucus et al. | |
| 5,790,785 | A | * | 8/1998 | Klug et al. | 713/202 |
| 5,848,412 | A | * | 12/1998 | Rowland et al. | 707/9 |
| 5,854,893 | A | * | 12/1998 | Ludwig et al. | 709/204 |
| 5,941,945 | A | * | 8/1999 | Aditham et al. | 709/205 |
| 6,000,033 | A | * | 12/1999 | Kelley et al. | 713/201 |
| 6,078,322 | A | * | 6/2000 | Simonoff et al. | 345/335 |
| 6,091,412 | A | * | 7/2000 | Simonoff et al. | 345/335 |
| 6,092,196 | A | * | 7/2000 | Reiche | 713/200 |

* cited by examiner

Primary Examiner—Krisna Lim
(74) Attorney, Agent, or Firm—James B. Bechtel, Esq.; Raymond H. J. Powell, Jr., Esq.

(57) ABSTRACT

A White Board system permitting a plurality of users to collaborate with one another irrespective of the respective user's hardware platform or operating system includes a server computer, and a plurality of client computers electrically coupled to the server computer. Preferably, each of the client computers logs into the server computer and is thereby assigned a unique identifier, each of the client computers includes a graphical user interface (GUI) which selectively displays any combination of objects having active content, active hyperlinks, and text, and each of the client computers transmits user-generated objects to the server computer for storage and selective retransmission to the computers. Additionally, the server stores all user-generated objects from all the client computers and selectively controls transmission of all user-generated objects to respective ones of the computers responsive to the respective assigned identifier.

20 Claims, 25 Drawing Sheets

FIG.1

```
<script language="JavaScript">
<!-- Hide the script from old browsers -- var timerID = null;
var timerRunning = false;
var id, pause=0,position=0;

function stopclock () {
            if(timerRunning)
                        clearTimeout (timerID);
            timerRunning = false;
} function showtime () {
            var now = new Date();
            var hours = now.getHours();
            var minutes = now.getMinutes();
            var seconds = now.getSeconds()
            var timeValue = "" + ((hours >12) ? hours -12 :hours)
            timeValue += ((minutes < 10) ? ":0" : ":") + minutes
            timeValue += ((seconds < 10) ? ":0" : ":") + seconds
            timeValue += (hours >=12) ? "P.M." : "A.M."
            document.clock.face.value = timeValue;
            timerID = setTimeout ("showtime()",1000);
            timerRunning = true;
} function startclock () {
            stopclock();
            showtime();
}
// --End Hiding Here -->
</script>
<body onLoad="startclock()">
<form name="clock" onSubmit="0">
<input type ="text" name="face" size=13 value="">
</form>
```

FIG.5A

```
<HTML>
<HEAD>
<title>Collaborator</title>
</HEAD>
<body bgcolor=#ffffff text=#000000 vlink=#ff5555 link=#0000ff>
<CENTER>
<font color=#00AA00><center><h5><UNCLASSIFIED</h5></center></font>
</CENTER>
<CENTER>
<IMG ALIGN=CENTER SRC="dodlogo.gif" alt="Logo" height=150 width=150>
<br>
<h1>Collaborator</h1>
<br>
<applet code="wb.class" archive="wb.jar" width="20" height="20"
<param name=UploadURL value="http://doiing2.nswc.navy.mil/cgi-bin/fup2_cgi.pl">
<param name=FileDirectory value="uploadadmin/filelist.txt">
<param name=FileDirectoryPath value="uploadedfiles/">
<param name=DownloadURL value="uploadadmin/filelog.html">
<param name=UserGuideURL value="userguide.html">
<param name=RevHistoryURL value="revisionhistory.html">
<param name=WhiteboardSecurity value="UNCLASSIFIED"
<param name=PortNumber value="3457"
<param name=PanelLogo value="dodseal.gif">
<param name=Logo1 value="dodlogo.gif">
<param name=WhiteboardDrawObjects value="
```

FIG. 5B

```
*SELECT*,
Freehand,
Oval,
Filled_Oval
Rectangle,
Filled_Rectangle,
Text,
Image,
HyperLink,
java.awt.TextArea,
java.awt.TextField,
GUIPanel,
Map_Tracks
">
<param name=WhiteboardScrollBars value="YES">
<param name=WhiteboardPanelControls value="YES">
A Java enabled browser is required to view this page.
</applet>
</CENTER>
<p>
<b>
You may login as a guest.<br>
<br>
User: guest<br>
Password: guest<br>
</b>
<br>
<font size="2">
<i>Point of Contact</i><br>
Average Programmer<br>
<br><i>Last Updated Dec 03 1998</i>
</font>
</body>
</HTML>
```

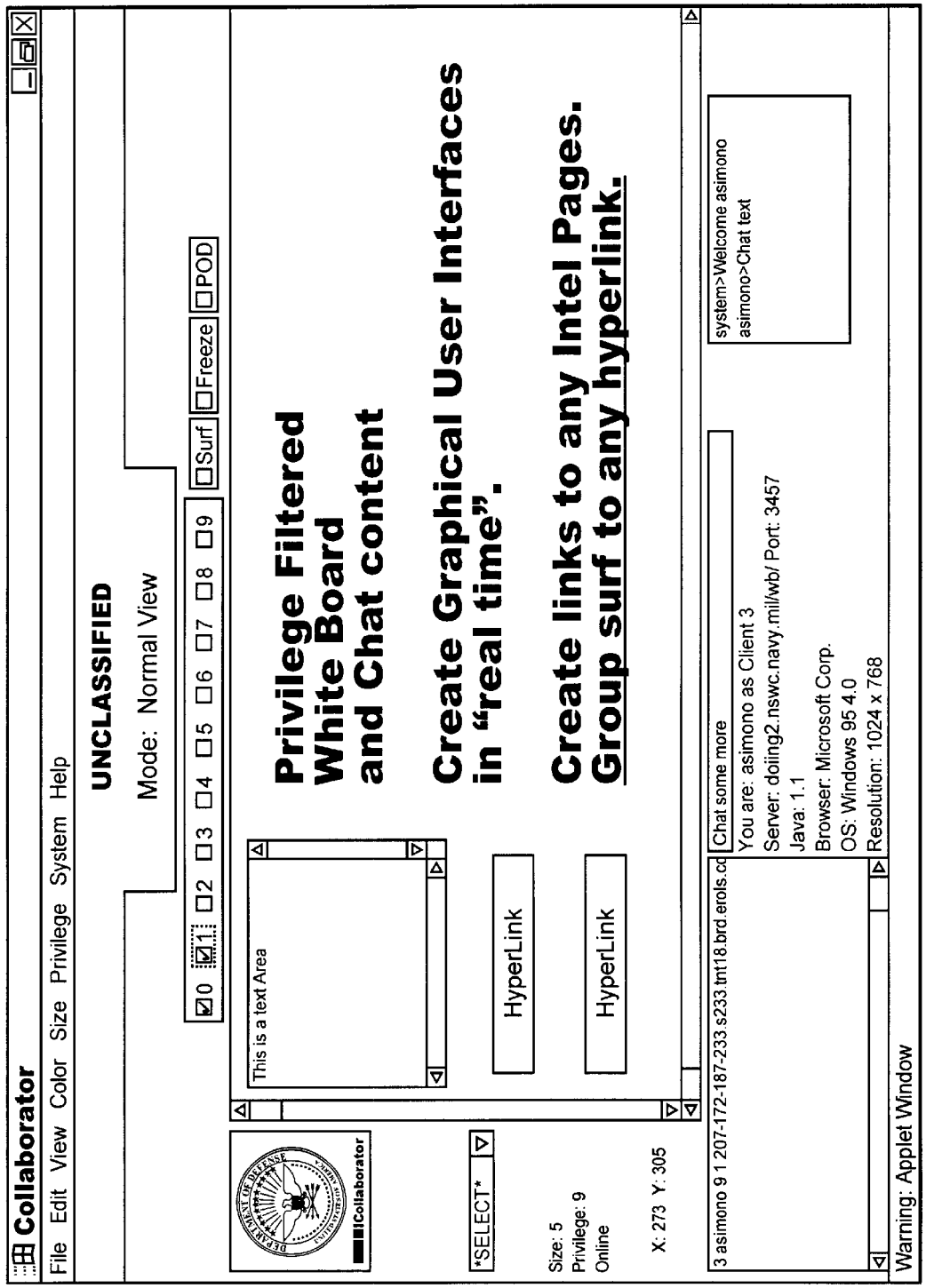

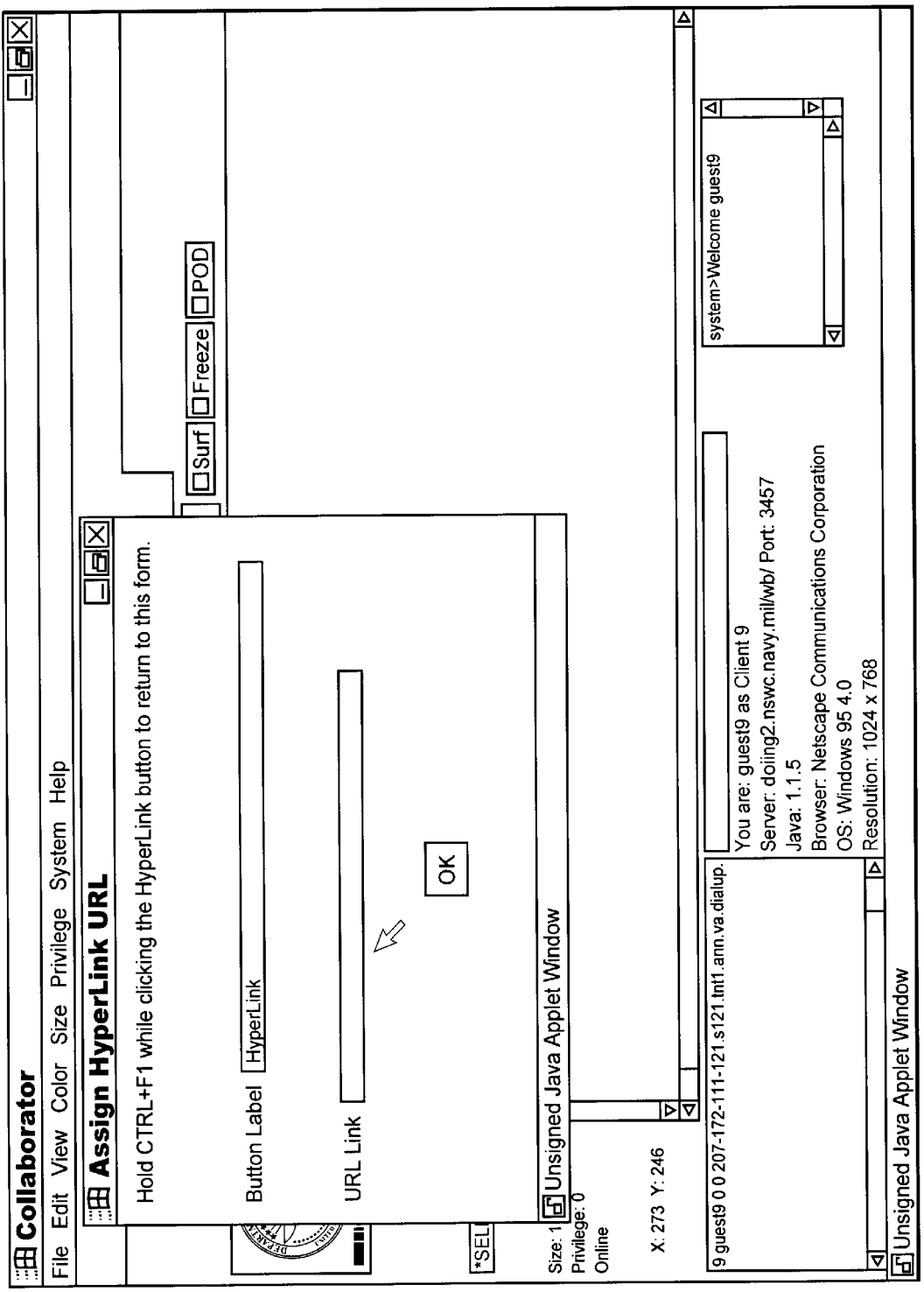

INTERACTIVE COMMUNICATION SYSTEM PERMITTING INCREASED COLLABORATION BETWEEN USERS

STATEMENT OF GOVERNMENT INTEREST

The invention described herein was made in the performance of official duties by employees of the Department of the Navy and, thus, the invention disclosed herein may be manufactured, used, licensed by or for the Government for governmental purposes without the payment of any royalties thereon.

BACKGROUND OF THE INVENTION

The present invention relates to the field of distributed computer systems. More specifically, the present invention relates to a computer system that facilitates interchange of information between two or more users sitting at respective computer terminals included in the computer system. According to one aspect of the present invention, two or more dissimilar computer terminals can present identical information to respective users and each of these users can annotate and/or update the information presented to all users.

Several services within the U.S. Military often need to interoperate, i.e., interact and communicate, with one another in order to plan and to subsequently carry out Joint Missions. More specifically, the participants in a Joint Mission must be able to share information including text data, images, and, more importantly, various computer generated displays of consolidated tactical information. Moreover, even when interoperability concerns are satisfied, this only assures that information can be transferred from the source of the information to the user of the information; there still exists the concern that the various users will be unable to coordinate their efforts, i.e., collaborate with one another, in planning and executing the mission and in critiquing completed missions. For example, while collaboration between various intelligence agencies and military branch during mission planning is essential, it often does not occur due the logistics involved in assembling the requisite personnel in one location. Thus, planning often involves an exchange of documents as one group develops a mission plan and the other groups or individuals critique the plan. Such planning is conducted using messages in the military realm or Email in the civilian world. Similar concerns exist in a corporate environment.

It will be appreciated that the various components of the U.S. Military use a heterogeneous collection of computers running a wide variety of operating systems, e.g., MS-DOS, Windows 3.1, Windows-95, Windows-NT, O/S-2, Macintosh O/S, and several versions of UNIX. The number of different systems which must be interconnected varies with each Joint Mission, making it extremely difficult for the components of the U.S. Military to interoperate. In particular, it is extremely difficult for the various military components to share a homogeneous view of tactical information. The degree of difficulty is often increased when the various military components are physically separated from one another over long distances. Although communication channels are available to interconnect the various computers, wide geographic separation generally dictates the use of a narrow band communications link.

Military components can share text data, maps and/or photographs used in conveying tactical data, after a fashion, even when using dissimilar computers. For example, map data may be displayed using a particular computer program, assuming that a version of the particular computer program tailored to run on each variation of the individual computers forming a computer system is available. It should be mentioned, however, that each branch of the service often uses branch-specific symbols for displaying information; the Army may designate ground troops using one symbol while the naval vessels providing fire support may use a completely different symbol to represent the identical ground troops. Moreover, the U.S. Military is often required to expend manpower and funds to generate a computer program for each variation of computer used in the Joint Mission.

It will be appreciated that the foregoing discussion assumes that several versions of the same program can be installed on the various computers being networked to one another; the problem is exacerbated when the computer systems which must be networked are running incompatible operating systems. For example, the Joint Mission parameters often dictate that a UNIX computer acting as a server, i.e., the computer providing data, be interconnected to various desktop computer and workstation clients, i.e., the computers receiving the data, which clients are running several other incompatible operating systems.

The advent of the Internet, and particularly the World Wide Web (the Web), has provided at least two technical advances which promise to preserve the investment made by large computer operators such as the U.S. Military in hardware, software and training. In particular, these two technical advances provide techniques for distributing applications, or pseudo-applications within hypertext markup language (HTML) documents sent by the server to at least one client over the public Internet or a private Intranet. The latter case will be discussed first.

It is now possible for servers to provide clients with HTML documents having expanded capabilities by virtue of their use of a scripting language such as JavaScript, i.e., a limited programming language designed to extend the capabilities of another application. For example, the numerical clock illustrated in FIG. 1 was generated by the JavaScript routine also illustrated in FIG. 1. The JavaScript routine is downloaded to a client running an appropriate JavaScript Interpreter, which causes the client computer to display, by way of another example, an order form (not shown) in the downloaded Web page. It will be appreciated that the data generated using the JavaScript form is transferred to a common gateway interface (CGI) program in the conventional manner.

Alternatively, the server may provide clients with JAVA™ applications (Applets) embedded into the HTML document. It will be appreciated that a JAVA™ Applet is a small program which can be run automatically as soon as the associated HTML document is transferred from the server to the client(s); several JAVA™ Applets may be transferred to a client within a single HTML document. It will be noted that current technology is moving away from fat clients, i.e., full programs, to thin clients, i.e., JAVA™ Applets. The principal advantage to the latter approach is in program configuration control, i.e., just the server side program is updated; the client automatically receives the latest version, for example, of the JAVA™ Applet when the associated HTML document is transferred to the client(s).

In short, an unacceptable amount of time and money is still required to ensure interoperability between the participants of the Joint Mission, even after moving from the fat client approach to the thin client approach to facilitate configuration control.

As discussed briefly above, the ability for remotely located users to collaborate with one another is significantly different from the ability to collaborate with several co-located individuals. Some discussion of the differences between these two disparate forms of collaboration would probably be helpful at this point.

As discussed in U.S. Pat. No. 5,206,934, which patent is incorporated herein by reference for all purposes, when a user performs an operation in a stand alone application with an input device such as a mouse or keyboard, an event is generated by the operating system and passed to the application program for execution. The stand alone application interprets the events and performs operations to change its internal data in response to the users' request. Such events include, for example, performing a deletion step in a word processing program or creating a graphic element in a computer-aided design (CAD) program.

When the application is expanded from a single user into a multiple user environment, such as simulating a conference over a network or a modem, each user must be able to manipulate the same data and see all of the modifications made to the data. To do this, each machine must interpret and transmit information about what the user is doing and what the user is seeing. There are three basic approaches to accomplish these results. These approaches correspond to three levels of data manipulation referred to as user input, data modification and visual display. Each approach intercepts and transmits information at the particular level. As a result, each approach has specific drawbacks and benefits.

At the highest level, i.e., the user input level, each machine intercepts its user input and transmits that input to other machines. For example, if the user clicked the mouse at a screen location (100, 150), the machine would transmit a "mouse click" command with those coordinates to other machines in the conference. The drawback of this approach is that it requires that all machines be set up in exactly the same manner including identical hardware operating systems and applications. If one user has an icon or symbol in a different place on his screen than other users, then a mouse click on that icon on one machine will not be a mouse click on the icon on the other machines. As a result, communication between the people using the system quickly breaks down because they are each seeing different things on their respective screens, thereby making this method of conferencing unusable.

At the lowest level, namely visual display, each machine intercepts visual outputs to the screen and sends it to all other users so that they see the same screen. A program which performs such a function is sometimes referred to as a remote control program. Under such schemes, one machine acts as a host and contains all of the data that is manipulated. The other machines pass user inputs to the host machine and receive screen change commands back. A drawback of this method of conferencing is that it requires a large amount of information to be transmitted in the form of all or part of the screen memory and as a result it is relatively slow and inflexible. Also, because all the users in the conference share the same information, all users must possess sufficient hardware and software to display the screen information including complex graphical representations.

Both of the aforementioned methods manipulate data through one entry point. In other words, even though multiple users are working on a document, each user is seen as a single entity to the system. As a result, if one user selects text in a word processor and another user types the key, both operations will be considered as originating from one user, and the data may be accidentally destroyed. Thus, the user input and visual display systems are not truly collaborative wherein multiple users may modify the data concurrently.

In mid-level conferencing, application primitives (units of information necessary to duplicate the user's operation on remote machines) are sent from one machine to the other. While this has been done to some extent at the research level, the drawback is that some centralized control is necessary to implement the exchange of primitives. Another drawback is that high performance (speed) computers and expensive computer systems are necessary to implement such mid-level conferencing in real time. Further, with a centralized architecture, performance limitations are incurred because at least two message transmission delays result between the originating work station and the controller and then back. While the time delay may be reduced by inter-work station communications, a controller work station is required and conflicting commands must be reversed or reexecuted.

In summary, U.S. Pat. No. 5,206,934 concludes that all of these approaches have serious drawbacks. Some of the approaches rely on host, terminal or master slave relationships among the various users. Some systems only work with the same operating system. Some attempts merely allow one user at a time to access the data. In the case of remote systems, a master controller requires interpretation of screen change commands, which can be slow when the high data volume is relatively high. In primitive passing systems, the problem is alleviated but at the cost of central processing with high performance equipment.

U.S. Pat. No. 5,206,934 proposes an alternative method and apparatus for conferencing among a plurality of computers wherein a local user receives inputs containing user actions and data for interpretation as to what the user action is with respect to the data and produces user action outputs. An interpreter/encoder interprets and encodes the user action outputs into packets of encoded commands and data related thereto. Then, a communications device sends the encoded information to at least one remote user and the local user itself. An interpreter decoder at each computer interprets and decodes the encoded information specifying an operation to be performed on the data. The operation is then executed at the local user and the remote users. In other words, each user on the system works on his/her own version of the document be worked on. Moreover, the system is operating system independent and multiple documents and applications may be worked on at the same time by different sets of users.

In contrast, U.S. Pat. No. 5,515,491, which reference is incorporated herein by reference for all purposes, discloses a method and corresponding system which permits management of communications within a collaborative computer-based system including multiple display devices. A shared data object, e.g., a text object, portions of which, e.g., paragraphs, may be displayed on the display devices, is simultaneously accessible by multiple users within the system. Cursors are provided within the shared data object, e.g., the text object, and each cursor is associated with a respective one of the users. In managing communications within the collaborative computer-based system, a region within the shared data object may be designated, a paragraph may be selected by one of the users. A designated message is then automatically transmitted to all users in response to selected activities of one or more users within the designated region of another user for the shared data object.

Other computer system approaches with respect to collaboration between far flung personnel via the Internet or a dedicated Intranet have been made. More specifically, several programs for collaboration between widely separated personnel are currently available. For example, POW WOW and NetMeeting, the latter being available from Microsoft, Inc., are personal computer (PC) based programs for collaboration. NetMeeting, for example, permits users to first find other users in cyberspace and then share files, chat, video conference, sketch, etc. However, neither NetMeeting nor any of the other approaches discussed above, permits active content, links, and GUI objects, nor do these programs and collaboration methods allow for central data storage, logging, and filtering.

What is needed is a computer network or system wherein various users can use the same computer program and share information beyond the visualization of a map, text or photograph regardless of variations in the individual components of the system. Moreover, what is needed is a practical computer system which enables users to quickly and easily interchange graphical user interface (GUI) objects with one another in real time. In short, what is needed is a computer system and corresponding method of operation wherein a computer system achieves component interoperability, collaboration, and cost savings irrespective of computer variation and architecture of the individual computers making up the computer system.

SUMMARY OF THE INVENTION

Based on the above and foregoing, it can be appreciated that there presently exists a need in the art for a computer system and corresponding operating method which overcomes the above- described deficiencies. The present invention was motivated by a desire to overcome these and other drawbacks and shortcomings of the presently available technology, and thereby fulfill this need in the art.

One object according to the present invention is to provide a computer system for interconnecting various military components efficiently and for enabling those components to collaborate with one another effectively. According to one aspect of the present invention, the computer system advantageously permits military components to use the same computer program and share information beyond the visualization of a map, text or photograph regardless of variations in hardware and software between the networked computers.

Another object of the present invention is to provide a computer system whereby computer users are able to interoperate with one another irrespective of any variation between the individual computers forming the computer system.

A further object of the present invention is to provide a computer system whereby computer users are able to collaborate with one another irrespective of any variation between the individual computers forming the computer system.

Yet another object of the present invention is to provide a computer system whereby computer users are permitted to interoperate with one another using a single computer software application program. According to one aspect of the present invention, the single computer program advantageously can be operated by all users substantially unchanged, i.e., without modification or recompilation.

Yet another object of the present invention is to provide a computer system formed from relatively incompatible components which is capable of presenting shared information to all users regardless of vehicle or platform.

Moreover, another object of the present invention is to provide a computer system permitting computer users to interoperate regardless of their geographic location.

Still another object of the present invention is to provide a method suitable for conducting networked classroom training. According to one aspect of the present invention, one of the objects included in the GUI advantageously can be a player for displaying video information, which information can be either live, i.e., a real time video display, or prerecorded. According to another aspect of the present invention, the GUI advantageously is capable of displaying several objects simultaneously; a MultiMedia object can be displayed while an associated page of a training manual is retrieved and displayed in a text window.

Yet another object of the present invention is to provide a method facilitating interaction between two or more clients via a server. According to one aspect of the present invention, the degree of interaction between the clients can be predetermined and/or controlled from the server, e.g., a central administrator.

Moreover, additional objects of the present invention are to provide a computer system and a computer architecture independent method for creating user front end GUIs for networked applications while reducing software creation, distribution, maintenance and support costs, preserving investments in legacy hardware, improving software reuse, providing architecture independence of dedicated display consoles, improving system survivability and availability (since any single console can perform the same function as any other console), and reducing the cost of new hardware.

It will be appreciated that the present invention is not to be limited to systems and methods including one or more of the above-identified objects, i.e., none of the enumerated objects need actually be present in invention defined by the appended claims since only certain, and not all, objects of the invention have been specifically described above. Numerous other objects advantageously may be provided by the invention, as defined in the appended claims, without departing from the spirit and scope of the invention.

These and other objects, features and advantages according to the present invention are provided by a White Board system permitting a plurality of users to collaborate with one another irrespective of the respective user's hardware platform or operating system includes a server computer, and a plurality of client computers electrically coupled to the server computer. Preferably, each of the client computers logs into the server computer and is thereby assigned a unique identifier, each of the client computers includes a graphical user interface (GUI) which selectively displays any combination of objects having active content, active hyperlinks, and text, and each of the client computers transmits user-generated objects to the server computer for storage and selective retransmission to the computers. Additionally, the server stores all user-generated objects from all the client computers and selectively controls transmission of all user-generated objects to respective ones of the computers responsive to the respective assigned identifier.

These and other objects, features and advantages according to the present invention are provided by a White Board system permitting a plurality of users to collaborate with one another irrespective of the respective user's hardware platform or operating system. Preferably, the White Board system includes a primary server computer, and a plurality of client computers coupled to the primary server computer, each of the client computer having a respective privilege level and each of the client computers being operatively connected to the primary server computer. According to one aspect of the present invention, each of the client computers transmits user-generated objects to the primary server computer. Moreover, the primary server stores all of the user-generated objects transmitted from the client computers, and the primary server selectively transmits the user-generated objects to respective ones of the computers responsive to the respective privilege level.

These and other objects, features and advantages according to the present invention are provided by a White Board system permitting a plurality of users to collaborate with one another irrespective of the respective user's hardware platform or operating system including a first client computer which instantiates first objects having a first privilege level, a second client computer which instantiates second objects having a second privilege level, and a server computer operatively coupling the first and the second computers. More specifically, the server computer includes a memory for storing all of the first and the second objects, and a filter which selectively relays the first and the second objects between the second and the first client computers, respectively, responsive to the first and the second privilege levels. According to one aspect of the present invention, the server computer advantageously includes a plurality of filter to thereby permit filtering of the object using multiple criteria, one of which is privilege level.

Additional objects, advantages and novel features of the invention will become apparent to those skilled in the art upon examination of the following description or may be learned by practice of the invention. The objects and advantages of the invention may be realized and attained by means of the instrumentalities and combinations particularly pointed out in the appended claims.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 1 is an illustration of a computer screen depicting an object generated using the JavaScript scripting language and the corresponding JavaScript code listing;

FIG. 5 depicts the hypertext markup language (HTML) version of a web page including the White Board Applet tag invoking the White Board according to the present invention;

FIGS. 12A, 12B, 12C, 12C, 12D, 12E, 12F, 12G, and 12H are illustrations of screen captures depicting various operational aspects of the White Board according to the present invention.

DETAILED DESCRIPTION OF THE PREFERRED EMBODIMENTS

One of the principal objects of the present inventions, although certainly not the only one, is to provide a Universal Distributed Display Capability (UDDC) for operating substantially all military applications on any commercial off the shelf (COTS) based system supporting a JAVA™ enabled browser. A preferred embodiment of the present invention accomplishes this objective through a software application written in JAVA™ implementing a Common Collaboration Environment (CCE). Beneficially, the combination of the CCE software and a JAVA™ enabled browser at each user location permits collaboration between users of a multilayer White Board.

In an exemplary case, the CCE software advantageously can be a JAVA™ applet. The CCE application according to the present invention (hereinafter White Board) allows a large organization, e.g., the Government or a far-flung organization, to solve certain interoperability problems while satisfying collaboration requirements and, thus, satisfy all of the following goals:

a. Display tactical and strategic information on any vendor's modern commercial off the shelf (COTS) equipment without modification;

b. Permit display of active moving content, as well as incorporation of active hyperlinks and active GUIs.

c. Requires that all users log into a White Board secure server, allowing each client to be uniquely identified and allowing a system administrator to "kill" White Board clients, i.e., forcing the White Board client offline;

d. Deliver a technology for providing training both afloat and ashore, independent of the system on which training is being provided and independent of the training facilities available.

Figure 2:
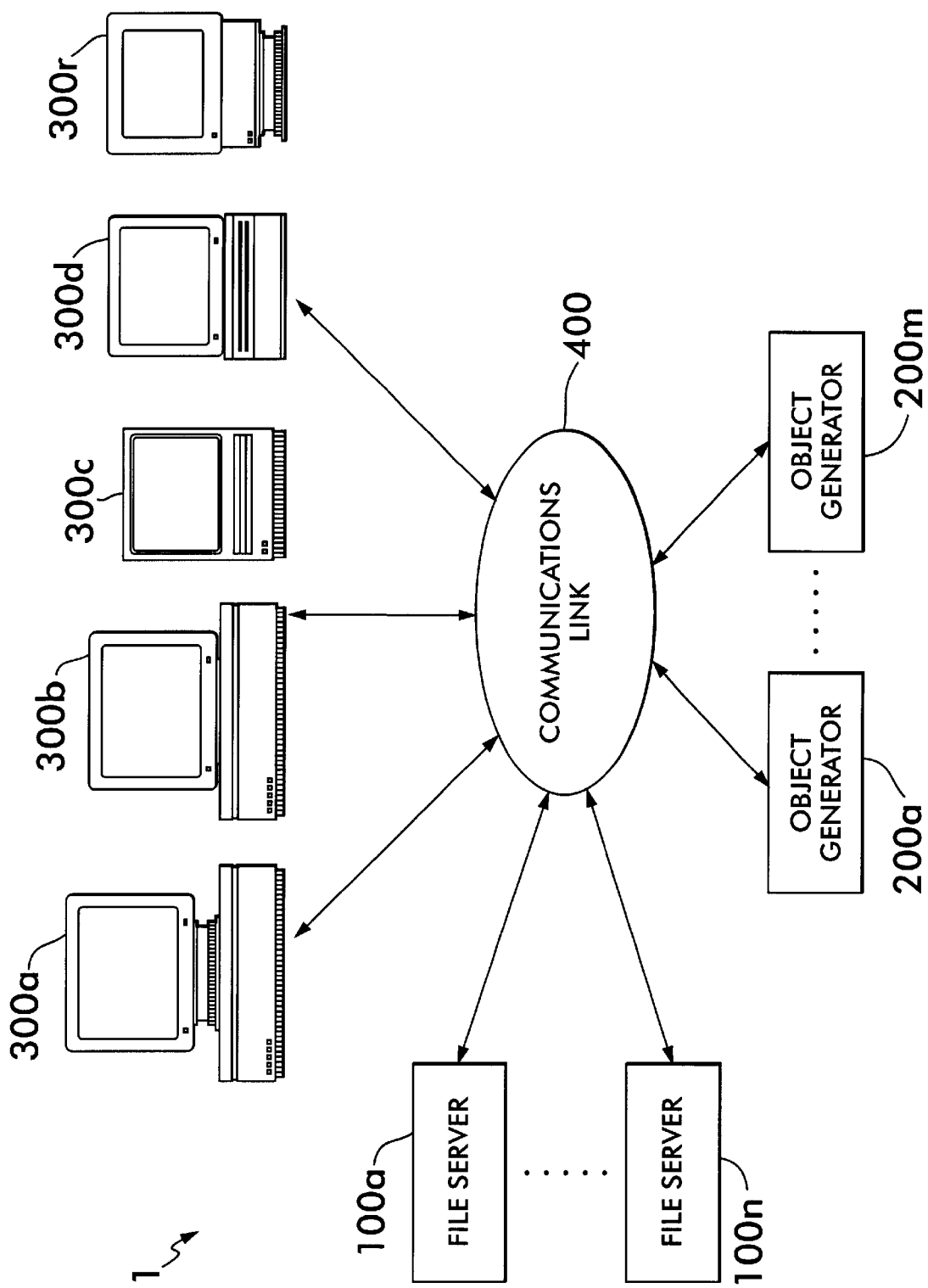
FIG. 2 is a high-level block diagram of a computer system according to the present invention.

A preferred embodiment of the present invention will now be described while referring to FIG. 2, which illustrates a computer system 1 in high-level block diagram form. Preferably, computer system 1 includes servers 100a through 100n, object generators 200a through 200m, and computers 300a–300r. All of the servers 100a–100n, the object generators 200a–200m and the computers 300a–300r advantageously are operatively connected to one another via a communications link 400. In an exemplary case, the object generators 200a through 200m can be combat subsystems, although the subsystems could just as well be computer systems generating weather maps or stock tickers.

In an exemplary case, servers 100a–110n are UNIX servers while the object generators 200a–200m advantageously can be systems such as radar systems, status boards, satellite ground stations, video cameras, etc. Preferably, each of the machines 100a–100n and 200a–200m include a processor, working memory, a storage device such as a hard disk and a communications device, e.g., a network interface card. It should also be mentioned that computers 300a–300r can include desktop computers, laptop computers and/or workstations in any mix. Advantageously, these computers can include a central processing unit, a graphic display processor, the graphic display device, e.g., monitor, a communications device and several memories including both solid state memories, i.e., random access memory (RAM) and a hard disk drive. Preferably, link 400 is a local area network (LAN), although the link 400 advantageously can be a wide area network (WAN) or other interconnection facility such as a frame-based satellite network or even the Internet. Thus, although a JAVA™ enabled web browser is a preferred platform for initiating the White Board according to the present invention, connection to the Internet or World Wide Web is NOT required. The computer system 1 advantageously can be a detached local area network or intranet for practical and security considerations.

It will be appreciated that the present invention was developed in response to perceived problems in the interoperability of legacy computer hardware used in combat systems and networks and solved those problems. However, since the ramifications and applications of the present invention go far beyond the interoperability of combat system hardware, the discussion which follows will use appreciably broader terminology in describing the system and corresponding operating methods according to the present invention.

Figure 3:
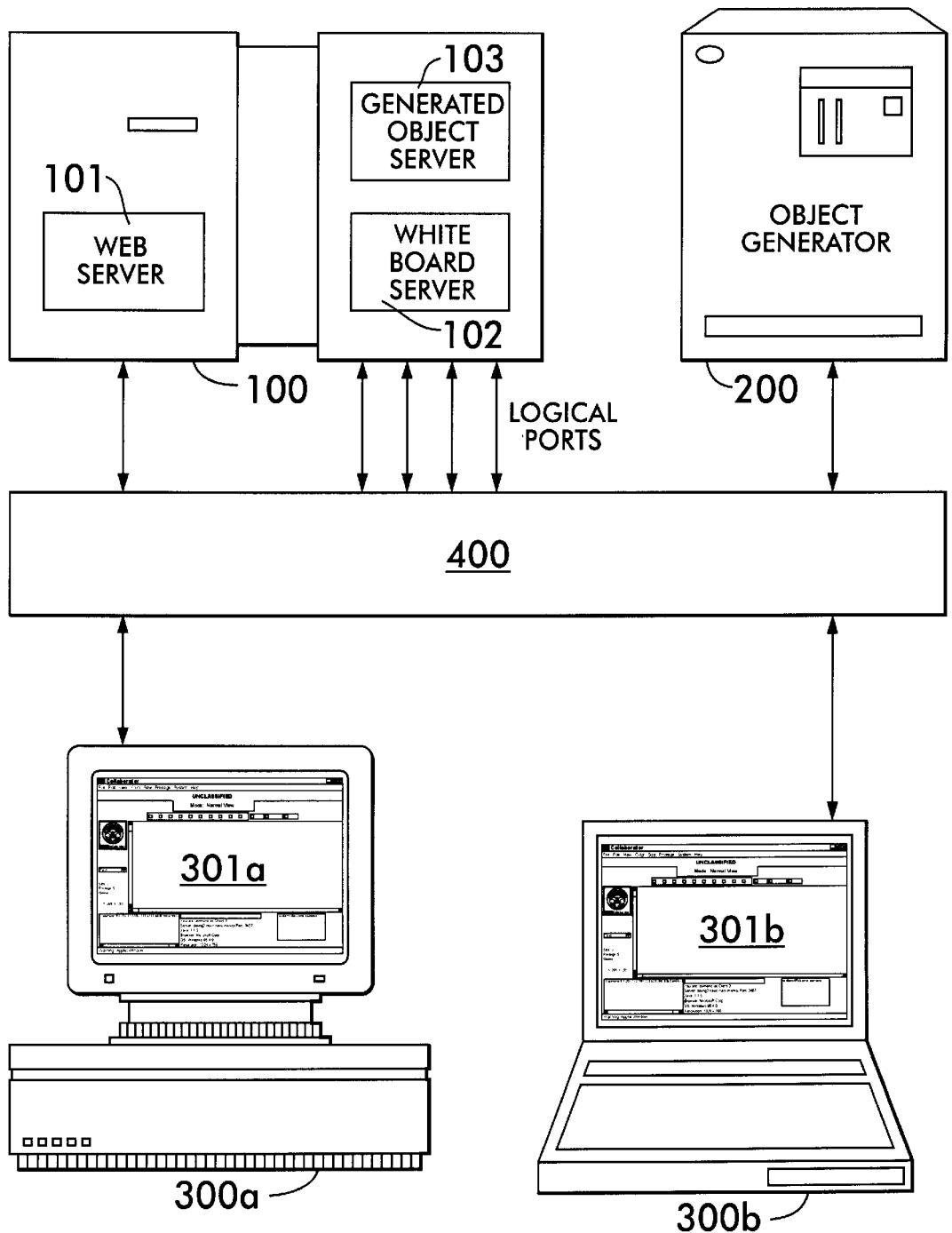
FIG. 3 is a high-level block diagram of selected components of the computer system according to the present invention illustrated in FIG. 2, which illustrates the operation of one of the several alternative operation techniques permitted by the present invention.

Referring specifically to FIG. 3, a computer system 1 according to the present invention includes a server host 100, an application host, i.e., object generator, 200, and client host computers 300a and 300b, all of which are interconnected to one another via a LAN or WAN 400 (hereinafter LAN 400). It will be appreciated that LAN 400 advantageously can be any communication channel capable of interconnecting the various distributed components of the computer system 1. Preferably, the server host 100 provides a Web server 101, a White Board server 102, and a generated object server 103, as discussed in greater detail below. The application host 200 advantageously can be another computer running a predetermined program to generate an object which can be accessed by the users operating client hosts 300a and 300b. Alternatively, the application host 200 advantageously can be a file server storing files such as maps and satellite images. Client hosts 300a and 300b beneficially provide a JAVA™ enabled web browser, i.e., a web browser implementing a JAVA™ virtual machine, while the Web server 101 on server 100 stores a web page and associated White Board Applet tag. See FIG. 5 for an exemplary web page listing. When the downloading of the web page from the Web server 101 to the client host 300a, i.e., the web browser on the user's computer, is completed, the White Board Applet is executed to thereby display the White Board according to the present invention on the user's computer.

More specifically, when the White Board Applet 301a on client host 300a runs, it will connect to the White Board Application Server 102 running on server 100 while displaying all of the windows for the client-side White Board display, i.e., the White Board GUI will be presented to the user. The user can then run the White Board application, which can transfer data between the White Board server 102 running on server 100 and other White Board clients, i.e., computer 300b. As discussed in greater detail below, the object generator 200 advantageously can provide information, i.e., an image, which may be an active image, for display on the White Boards presented on computers 300a and 300b via generated object server 103.

The White Board client 301 according to the present invention will now be discussed while referring to FIG. 4, which illustrates the White Board running on a computer 300 resulting from the collaboration of several users remotely located with respect to one another. The various features of the White Board will be discussed in numerical, i.e., counterclockwise, order and not in order of importance.

As denoted by numeral 1001, the White Board client 301 presents what appears to be several standard drop down or pull down menus. The File drop down menu includes commands for both uploading and downloading files to the White Board server 102. For example, a map file resident on computer 300a could advantageously be uploaded to the server 100 or a map residing on server 100 advantageously could be downloaded to White Board client 301a via network 400. It will be appreciated that irrespective of whether the file is uploaded or downloaded, each respective White Board client 301 advantageously can display the selected image file. It should be mentioned that the present invention is not limited to transferring image files; text and data files can also be interchanged without limitation.

Figure 6:
FIG. 6 is an illustration of a computer screen depicting files available for downloading to the White Board client computer 300a of FIG. 3.

As illustrated in FIG. 6, which depicts a Web page listing of files available for downloading to a White Board client 301a, it will be appreciated that the White Board server 102 advantageously maintains a list of the files which are uploaded to it, the specific client originating the upload, the address, e.g., numerical address of the machine originating the upload, and the identity of the user, i.e., user number, performing the upload. Maintaining this information permits the White Board administrator to track information on file uploads and downloads, i.e., promotes traceability.

A comprehensive listing of the features and functions accessible via the pull down menus is set forth immediately below.

| File | Open | This item allows the user to select any file from the shared file upload area. The files listed in the file dialog window are received from the White Board server 100 via the LAN 400. The user may place an image on the White Board client 301 by selecting an image file and specifying a location on the White Board. The user may scale the image to fit within a bounded rectangle by checking the Bounded checkbox. The user then drags out a rectangle on the White Board which the image will occupy. It should be mentioned that the native file handling capabilities of the browser will be used by the White Board to open any file type that is not a conventional JPEG (*.jpg) or GIF (*.gif) formatted image. In other words, the White Board client opens JPEG and GIF files; the Web browser opens other file types. See "Surf" discussion below. |
|---|---|---|
| | Upload | This item allows the user to upload any file to the shared file upload area of the server 100. The browser will open an upload form inside of a new browser window. After the user uploads a file, the browser will acknowledge that the file has been successfully uploaded and return control to the White Board client. |
| | Download | When download is selected, the browser will open a new browser window with a similar looking web page displaying the information illustrated in FIG. 6. Clicking on a link in the page will cause the browser to access the file. |
| | Close | This item closes and logs the user out of the Common Collaborative Environment. Closing the window using the native window controls will have the same effect. |
| Edit | Undo | This item allows the user to undo or erase the last change made on the White Board. It should be mentioned that all privileged users will see the result of the undone command. |
| | Clear | This item allows the user to erase everything on the White Board. All users will see the result of the clear command. |

-continued

| | | |
|---|---|---|
| View | Show ALL Layers | This item allows the individual user to view all drawing layers of the White Board simultaneously. |
| | Hide ALL Layers | This item allows the individual user to hide all drawing layers of the White Board simultaneously. |
| | Show CHAT | Toggles the display of a chat box on the White Board ON, which permits the users to communicate with one another by typing text into the text entry region of the White Board. Text from all users appears in the chat box. |
| | Hide CHAT | Toggles the chat box OFF, which frees up a portion of the White Board to thereby allow a larger drawing surface to be displayed. |
| | Refresh | This item allows the individual user to refresh or repaint everything on the visible layers of the user's own White Board. |
| | Draw on Layer XX | This type of item allows the individual user to select a drawing layer or overlay on which to draw on. |
| Color | Draw in XX | This type of item allows the individual user to select a drawing color. |
| Size | Draw at Size XX | This type of item allows the individual user to select a drawing font size or line thickness depending on drawing object selected. |
| Privilege | Draw at Privilege XX | This type of item allows the individual user to select a privilege for drawing objects placed on the White Board. By default, all drawing objects placed on the White Board by the user are set at the user's maximum privilege. This menu allows a user to down select the privilege which objects are drawn on the White Board. Privilege values exceeding the user's assigned privilege are not available for selection. The user account and all transmissions from their White Board carries the user privilege information. Chat text is also set at the user's privilege in the same way. This allows users with higher privileges to share information with each other while lower privileged users are logged into the same White Board session. For example, a user with Privilege 0 cannot view drawings or chat text sent by a user whose privilege is set at 1 or higher. The user whose privilege is set at 1 can, however, view the material sent by users having a Privilege set to "0." The server never sends data set at a higher privilege to users who have a lower privilege. |
| System | Diagnostics | This reveals the data traffic sent to and from the White Board. RESERVED FOR SYSTEM ADMINISTRATION ONLY. |
| | Administration | This provides access to user accounts and the ability to remotely close and terminate client user White Board sessions. RESERVED FOR SYSTEM ADMINISTRATION ONLY |
| Help | User's Guide | See above. See also Numeral 1017. |

Figure 4:
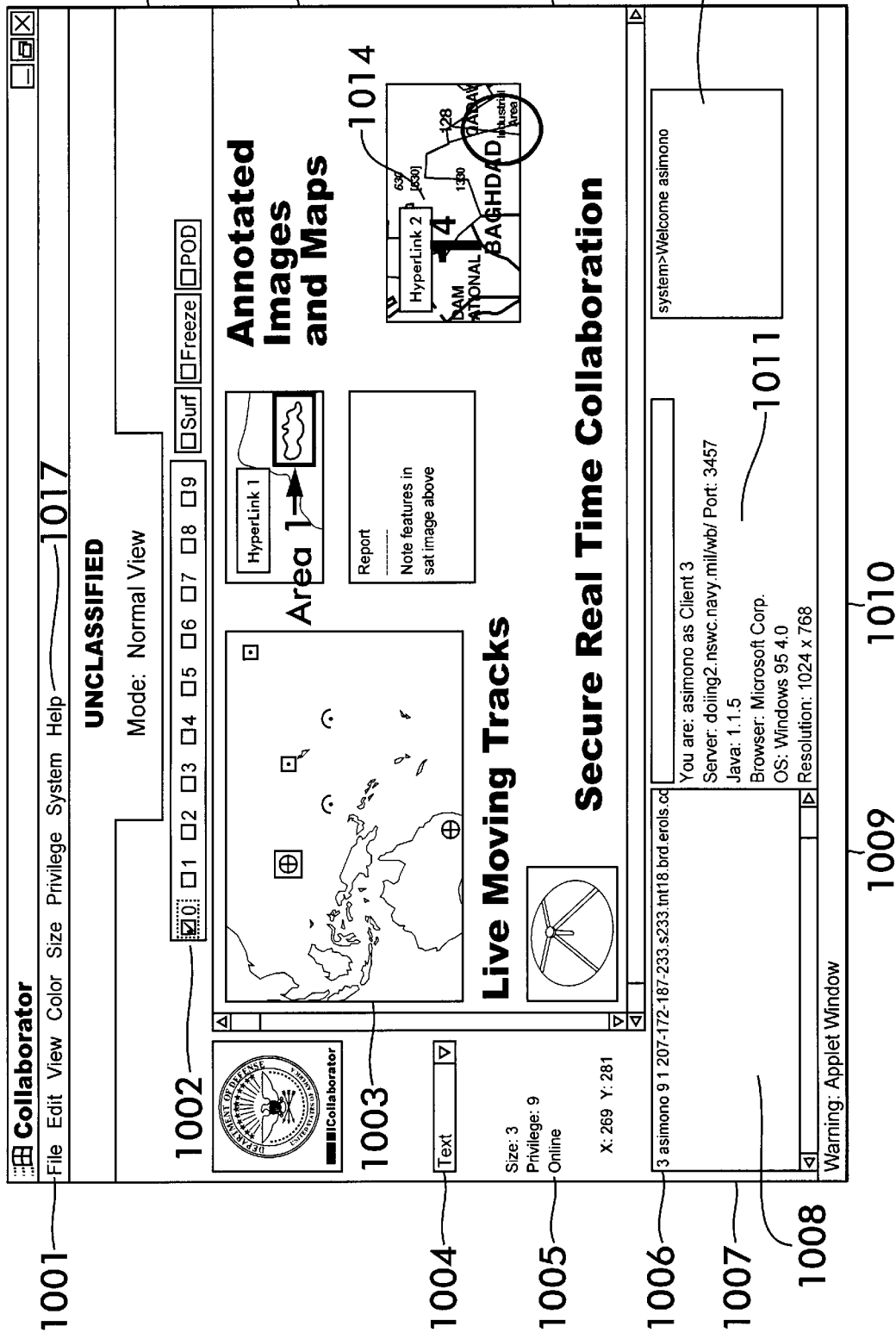
FIG. 4 is an illustration of a computer screen depicting the White Board according to the present invention.

Still referring to FIG. 4, numeral 1002 is employed to highlight the fact that there are a plurality of layers, i.e., a Layer Ladder, upon which the user can draw or type. In the exemplary case illustrated in FIG. 4, there is a total of ten (10) layers to the multi-layered White Board, each layer having as associated selection box. It will also be noted that there are three additional selection boxes labeled Surf, Freeze and POD.

The Layer Ladder allows the individual user to select a drawing layer by clicking on a check box such as the box labeled 0. The Layer Ladder also allows an individual user to hide and make overlay layers visible. A check in a check box denotes that the layer is visible to that user. All privileged items drawn on a visible layer will be shown to that user when the layer is checked. A color denotes that the layer is selected for drawing on. It will be appreciated that any number of layers may be made visible simultaneously. As shown in FIG. 4, Layer 0 is selected for drawing on with Black as the drawing color. This is the White Board default. A typical use of this capability is to place a map image on Layer 0, hyperlink controls on Layer 1 and Freehand markups on Layer 2. Users can then obtain unobstructed views of the map detail by hiding selected layers.

The "Group Web Surfing and Web Navigation" function is accessed through the Surf selection box. Checking this box allows the White Board to open a new browser window accessing a web page every time another user clicks on a Hyperlink button placed on the White Board. The web page address accessed is based on the address set in the Hyperlink control placed on the White Board. This capability allows all logged in White Board users to navigate to the same web page of information simultaneously as a point of discussion. In other words, the Surf selection box permits one user to specify a Uniform Resource Locator (URL) on White Board client 300a, for example, and, when the active link to that URL is established for White Board client 300a, all users having the Surf box selected will also jump to the URL selected by the user of White Board client 300a. It is NOT checked by default. In an exemplary case, setting the Surf control to active advantageously permits one user to view any document opened by another user using the "Open File" command from the White Board client's pull down menu. The Surf also permits a map-display object to remotely change the latitude and longitude and scale settings of the object.

The Freeze feature associated with the White Board according to the present invention is accessed via the Freeze selection box. Checking this box prevents the user's White Board from updating its display based on input from other users, thus allowing the user to view information without risk of another user initiating an UNDO or CLEAR command. It also permits the user to preserve, e.g., print, a copy of the current White Board for later use. It should be noted that chat text will continue as normal. It should also be noted that all White Board information from other users is cached in background on the White Board client 301. When the user unchecks the Freeze selection box, the White Board will update with all the drawing data that was cached, as discussed in greater detail below. This box is NOT checked by default.

The Paint on Demand (POD) function is accessed using the POD selection box. Checking this box allows the White Board to automatically make visible the layers that incoming privileged White Board objects are drawn on. It is NOT checked by default.

The numeral 1003 denotes an image in the active White Board area which has been pasted into the White Board area and which is employed to display active track content generated by subsystem 200. As will be discussed in more detail below, an active track wherein the track changes over time advantageously can be generated by an object generator computer 200 and transferred over the LAN 400 to the generated object server 103, and thence back over the LAN 400 to all of the White Board clients 301a and 301b running on computers 300a, 300b. It should be mentioned that here that elements of the White Board need to be activated via the White Board software but need not be sustained by the White Board server 102. Thus, in the event that the White Board server 102 develops a fault, the active tracks displayed on the respective White Board clients 301a, 301b advantageously can be continued to be updated, since these tracks are provided to the White Board clients by a different server, i.e., generated object server 103, via a different logical port.

Although the White Board server 102 and the generated object server 103 are stand alone applications in the exemplary embodiment under discussion, these functions were separated as an aid to understanding the White Board system operation. A single White Board server advantageously could provide both server functions when system requirements do not mandate that the objects generated by object generator 200 be displayable irrespective of White Board server status.

Figure 7:
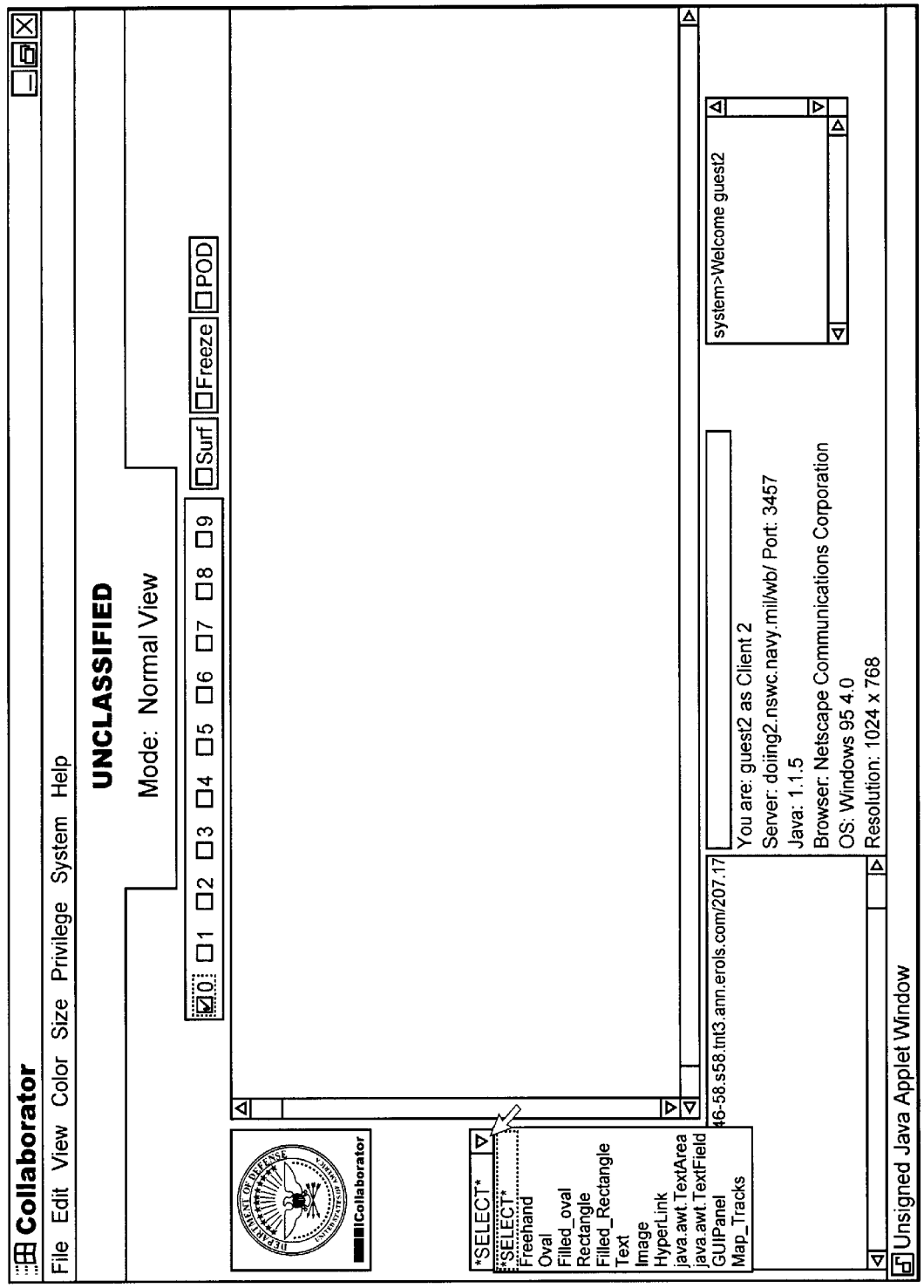
FIG. 7 is an illustration of a computer screen depicting the objects which can be selected for placement on the White Board client.

Numeral 1004 denotes a pull down window with the White Board where common data resources are available for selection by the users, as illustrated more fully in FIG. 7. In an exemplary embodiment, the data resources include, but are not limited to, Freehand lines, an Oval, a Filled_Oval, a Rectangle, a Filled_Rectangle, Text, Image, HyperLink, a java.awt.TextArea, a java.awt.TextField, and Map_Tracks. Before discussing the non-intuitive data resources, it should be mentioned that the available data sources are controlled by the system administrator by the simple and elegant expedient of listing the data resources in the web page containing the White Board Applet tag, as shown in FIG. 5. Thus, the system administrator can add or delete resources simply by editing and reposting the web page to the Web server 101. It will be appreciated that other "objects" such as multimedia objects, live video feeds, or banners, advantageously can be added to extend the White Board systems functionality in this way.

The data resources, i.e., objects, available to the users include such items as freehand lines, i.e., the line on the White Board follows the movement of the on screen cursor, predefined objects, e.g., oval and rectangles, and images, e.g., JPEG or GIF image files. In addition, the White Board data resources include at least three different types of text resources, plain text that can be placed anywhere on the screen, a java.awt.TextArea resource wherein text can be added to a scrolling window, and a java.awt.TextField wherein text can be added to a predetermined area of the White Board. Advantageously, the available data resources also include Hyperlink resource, whereby the user can place a button which operates an active hyperlink to a target URL on the White Board drawing area. See numeral 1014. It should be mentioned that operation of the hyperliink is affected by the Surf selection box, as discussed in detail above.

Numeral 1005 is employed to highlight the fact that the White Board displayed on the computers 300a and 300b employ an intuitive graphical user interface (GUI). Moreover, each user is provided with information regarding his respective White Board. For example, White Board indicates to the user the size of the drawing tool, e.g., line or text, the privilege of the user, whether the user is online or offline, and the position of the cursor with respect to the White Board. Preferably, the user is reminded of the classification, e.g., Confidential in military terms or Proprietary in civilian terms, of the material being entered on the White Board. The user's current color selection for lines, text, etc., preferably is indicated on the Ladder Layer display.

Numeral 1006 is used to highlight the fact that the White Board clients 301a, 301b on computers 300a, 300b advantageously can be display on any commercial off the shelf (COTS) computer system capable of employing a JAVA™-enabled web browser. Numeral 1007 and 1010 denote that the White Board software, and the users operating that software, advantageously can be monitored by a system administrator. For example, as shown by numeral 1008 in FIG. 4, each user logged into the White Board server 102 running on server 100 is identified to other White Board users, both by Client number and Internet or Intranet node identifier. As mentioned above, the system administrator can operate the White Board server 102 to both disconnect an unauthorized user from the White Board server 102 and force the White Board client 301 running on the unauthorized user's computer 300 to shut down or "kill" the White Board client 301, as an added security measure. It should be mentioned here that the White Board is "open architecture," as denoted by numeral 1009. It should also be mentioned that the White Board client is machine and operating system independent, as denoted by numeral 1016.

Numeral 1011 denotes that additional information regarding the White Board system is available to both the user and the system administrator. For example, the White Board client displays the numerical identifier of the user, the server 100 on which the White Board server 102 is running, the version of JAVA™ being employed, the identification of the browser software running on the client computer 300, the operating system employer by the client computer 300, and the resolution of the screen on which the White Board client 301 is being displayed. It will be appreciated that the White Board software determines the above-described information when the user logs into the White Board server 102 on server 100.

Numeral 1012 denotes the above-mentioned chat room or board. Preferably, this chat room provides multi-level security filtering for text and other White Board data. As discussed above, each user has a predetermined privilege; the user may communicate with all users at the lowest common privilege setting or communicate only with those users that have an equal or higher privilege level by selecting one of the available privilege levels from the pull down menu on the White Board. This permits a subgroup of higher privilege users to pass information and comments between themselves while the lower privilege users outside the subgroup remain unaware that information is being passed. It should be mentioned that White Board client 301a advantageously can communicate with White Board client 301b via the White Board server 102, in an exemplary case, by selecting the user of White Board client 301b from the user list. It will be appreciated that chat messages between these users will be sent at the lowest common privilege level.

Numeral 1013 highlights the fact that all areas of the White Board drawing area, including the area occupied by pictures and even moving tracks advantageously can be marked up, i.e., by freehand lines, boxes, ovals, etc., to highlight or annotate the material contained therein. Numeral 1014 highlights the fact that the White Board any user advantageously can link imagery to group web page navigation. Numeral 1015 highlight the fact that the White Board application is robust. For example, in the event that the White Board server 102 running on server 100a develops a fault, the White Board client advantageously can automatically log onto a backup White Board server 102b running on server 100b. As mentioned above, Numeral 1016 denotes that the White Board is machine and operating system independent by virtue of fact that, in an exemplary case, the White Board is implemented as a White Board applet on a JAVA™-enabled web browser.

The operation of the White Board will now be described while referring to the flow charts of FIGS. 8 through 11 in conjunction with the screen captures of FIGS. 12A–12H.

Figure 8:
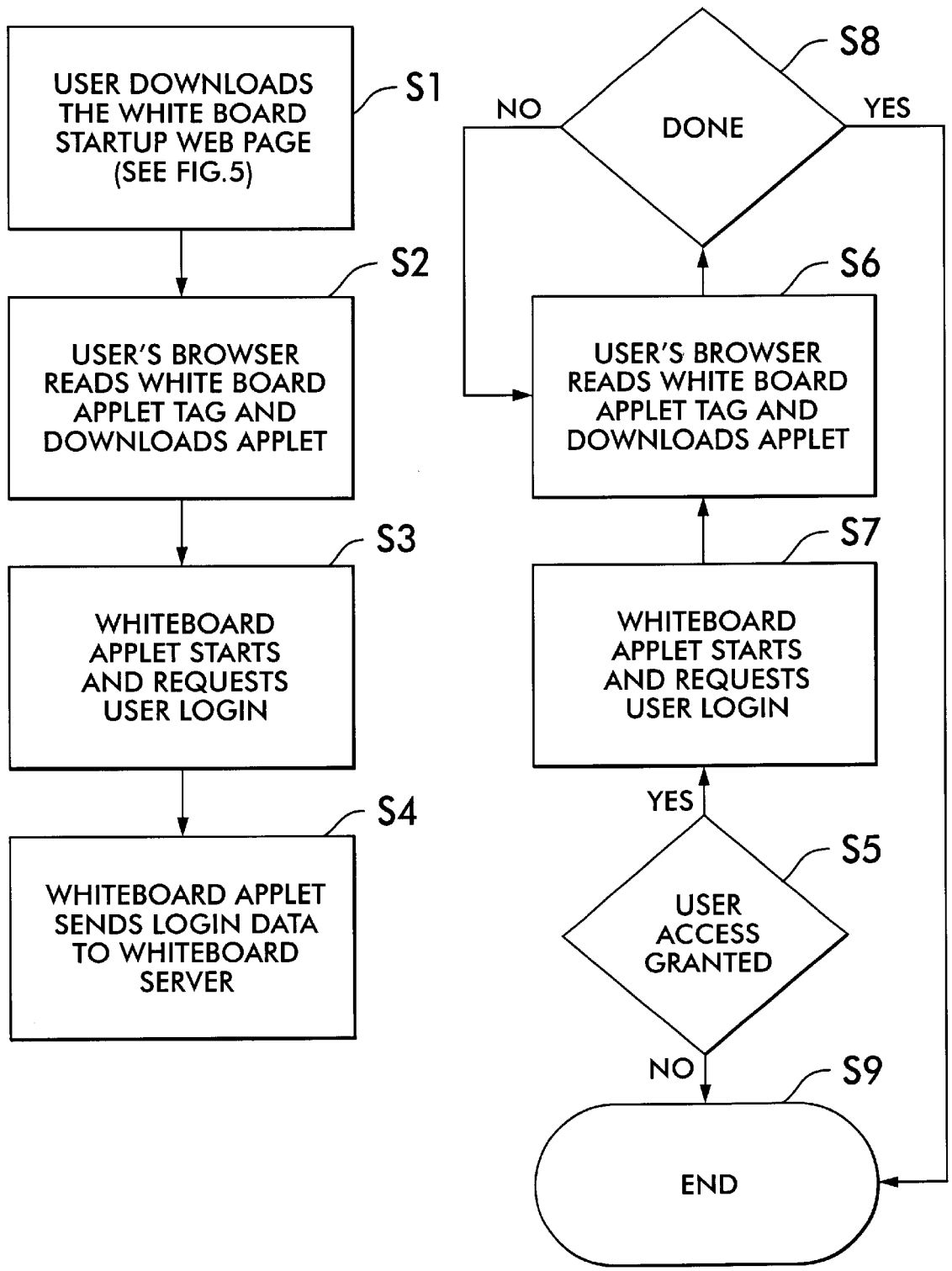
FIG. 8 is a high level flowchart of the startup procedure for the White Board.

First, the White Board is started, operated and shutdown as illustrated in the high level flowchart of FIG. 8. During step SI, the user on computer 300a, for example, connects to the web sever 101 operating on server 100 via LAN 400. The web server 101 downloads a web page containing the White Board Applet tag to the JAVA™-enabled web browser running on computer 300. When the JAVA™-enabled web browser encounters the White Board Applet tag, the White Board client applet is downloaded from server 100 to computer 300 during step S2. During step S3, the White Board Client 301 initializes and requests login information from the user, as a security precaution. During step S4, the White Board client 301 uploads login information, e.g., user name and password, to White Board server 102 via LAN 400. The White Board server 102 then determines whether the user attempting to login is an authorized user or not during step S5. In the event that the login information is acceptable, all features of the White Board client 301 running on computer 300 are activated during step S6. In the event that the user's identity is not acceptable to the White Board server 102, the White Board client shuts down during step S9.

Once the White Board client 301 a becomes available for use at step S6, either the user of the White Board client 301*a* or another user operating White Board client 301*b* updates the White Board client 301*a* during step S7, as discussed in greater detail below. Each change to the White Board client 301*a* triggers a check to determine whether the White Board client is to be shut down during step S8. In the answer at step S8 is negative, the users continue to cooperatively update the White Board client 301*a*; when the answer is negative, the White Board client 301*a* is shut down at step S9. It should be noted here that even though the manner in which the decision block S8 is labeled would lead one to surmise that it is only the user that can shut down his/her White Board client 301, the reader will recall that the system administrator can order the White Board client 301 to shut down over the LAN 400, providing a first level of security for the White Board application.

Although not specifically illustrated in FIG. 8, it will be appreciated that the user advantageously may be permitted several login attempts before the White Board server 301 automatically shuts down, in order to take operator error into account. Thus, either the White Board server or the White Board client may include a login attempt counter to provide another level of security for the White Board application.

It should also be noted that the White Board Applet tag embedded in the web page downloaded from web server 101 advantageously can specify the location of the White Board server 102, i.e., the computer on which the White Board server 102 runs need not be the same as the computer on which the web server 101 is run. Moreover, as discussed above, the White Board client 301*a* advantageously can shift from White Board server 102*a* running on sever 100*a* to White Board sever 102*b* running on server 100*b* in the event of a failure of either server 100*a* or White Board server 102*a*, i.e., the White Board server 102*a* can "fail over" to the White Board server 102*b*.

Figure 9A:
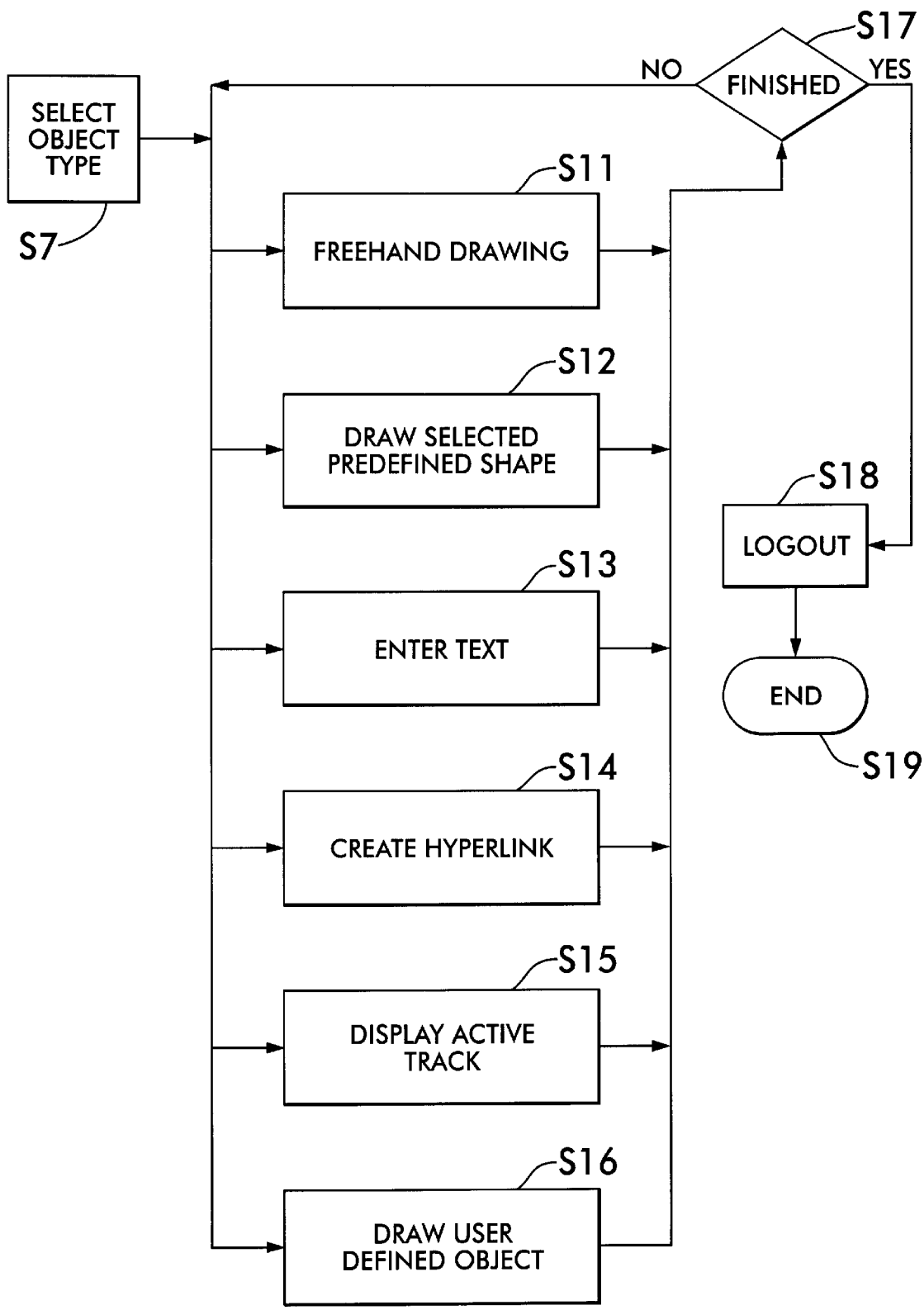
FIG. 9A is a high level flowchart depicting the steps producing changes to the White Board screen on the White Board client from the perspective of the White Board user.

The user draws on the White Board client 301*a* as illustrated in FIG. 9A, which is a flowchart reflecting operations from the White Board user's perspective. During Step S10, the user selects the drawing object pull down menu illustrated in FIG. 7. Then, the user selects one of the objects by executing one of the steps S11–S16 to add to the White Board display. A detailed discussion of adding non-intuitive objects to the White Board display area will be presented below. During step S17, the user determines whether to add other objects to the White Board display area. If the user desires to add other objects to the White Board display, an additional one of steps S11–S16 is executed. When the determination of step S12 is negative, the user logs out of the White Board client 301 during step S18, i.e., the White Board client 301 shuts down during step S19.

Figure 9B:
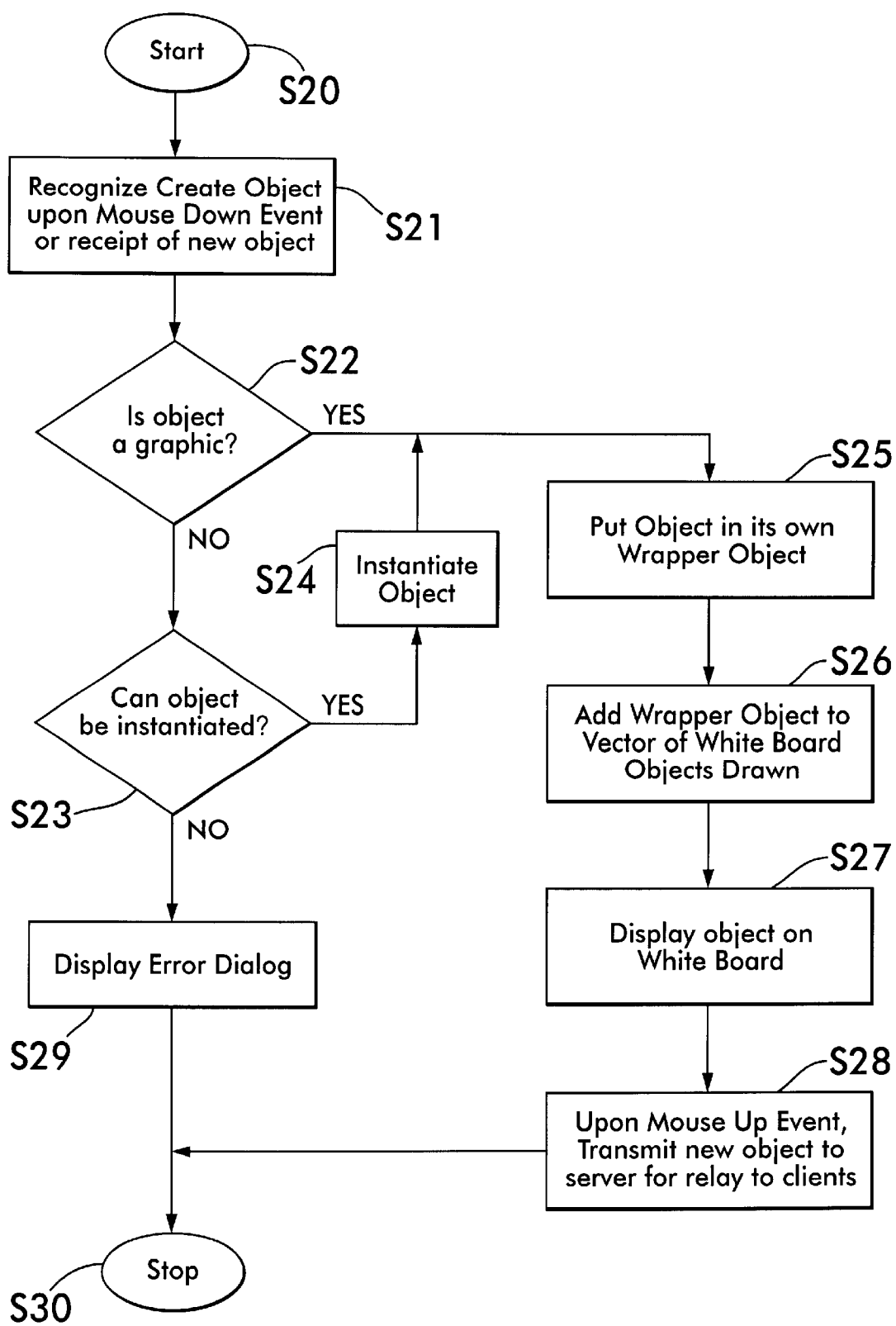
FIG. 9B is a high level flowchart depicting the step producing changes to the White Board screen on the White Board client from the perspective of the underlying White Board code.

From a programmers perspective, the White Board client 301 operates as illustrated in FIG. 9B. When the White Board client 301 starts at step S20, the White Board client waits for a "mouse down" event, since the exemplary White Board client is a JAVA™ applet, i.e., a event driven application. As will be discussed more fully below, selection of an object from the resource list depicted in FIG. 7 creates an empty wrapper, which wrapper is assigned a unique identifier and which wrapper contains the selected object label. Thus, when a mouse down event occurs at step S21, step S22 is performed to determine whether the object is a graphic, i.e., a bit map, object. When the answer is negative, another check is performed to determine whether the object can be instantiated, i.e., created, during step S24. When the answer at step S24 is affirmative, the selected object is instantiated; when the answer is negative, an error message is displayed during step S29 and the White Board client is stopped at step S30.

When the answer at step S22 is affirmative, i.e., is the object is a graphic object, or after the object is instantiated at step S24, the information needed to regenerate the selected object is placed into the above-mentioned wrapper, to thereby generate a wrapper object. As mentioned above, the wrapper includes a unique identifier so that the wrapper object can be locally identified, used by the local White Board client 301 and globally identified to prevent collisions with other wrapper objects. During step S26, the wrapper object is added to a vector holding all wrapper objects drawn on the local White Board client 301. Using the thus generated vector, the wrapper object is displayed in the White Board client 301. When a "mouse up" event occurs, the wrapper object is transmitted to the White Board server 102 over LAN 400 for relay to the other active White Board clients, as discussed in greater detail with respect to FIG. 11. It should be noted that "mouse up" should be understood to equate to "hard return" with respect to text, since the wrapper object containing text is transmitted to White Board server 102 when a hard return is sent by the user.

It should be mentioned here that the White Board system, i.e., both White Board client and White Board server, keeps track of all the wrapper objects to be displayed in their respective order via a vector. The vector advantageously stores a unique hash table lookup key for each object, i.e., each object in the hash table is referred to via a wrapper object. Thus, the wrapper object tells the White Board the kind of object to display, its location, size and other characteristics.

The wrapper object provides for an open architecture design so that developing new objects for use with the White Board is greatly simplified. Stated another way, the wrapper allows third party objects to simply plug-in to the White Board. The wrapper advantageously can be used to define additional characteristics of an object to be displayed without affecting the source code for the object to be displayed.

It should be mentioned that there are two Application Programming Interfaces (APIs) for objects that are meant to be displayed on the White Board. One is MANDATORY and one is OPTIONAL. Mandatory signifies that all objects to be displayed shall extend the Java Component class and have NO arguments in their constructor. An example of this is the Button object found in Java's Abstract Windowing Toolkit (AWT) which is a part of the Java runtime environment. In contrast, optional signifies that a White Board interface class may be implemented which requires certain subroutines or methods be available in the source code of the object meant to be displayed. An example of an optional API is the API which provides for the ability to mark up an already displayed object, i.e., to create and display a freehand drawing on top of a map object.

In terms of system architecture, every White Board Client 301 connects to a shared White Board server 102. It will be noted that no White Board client can communicate directly with another White Board client, White Board clients only communicate with the White Board server both for reasons of security and for reasons dictated by the programming environment. From a security perspective, the White Board system was developed to permit the White Board server to filter the data, wrapper objects, by privilege. Additionally, in order to insure traceability, i.e., the ability to retrace or recreate the steps by which the White Board display was generated, it is necessary to maintain a central logging and data storage capability. Moreover, it will be appreciated that Java applets further reinforce this security mechanism. The White Board client, as an unsigned applet, can only make a network connection to the machine address that served to it by the user's web browser.

As discussed above, when a user accesses the White Board system, he/she logs in, i.e., the White Board client presents a log in window and the White Board server verifies user identity by username and password. In an exemplary case, each is given three opportunities to log in. If the White Board server sees the log in window sitting idle, it times out the user's opportunity to log in. Upon a successful log in, a fully operational White Board client is displayed to the user. At that time, the new White Board client receives a White Board server assigned client identification number, in addition, all White Board clients receive a White Board server generated command to cause all White Board clients to update their list of logged in users, which list is displayed the White Board client, as discussed above. It will be appreciated that this list shows all users each others username, machine address, security privilege level and whether they have system administrator privileges.

When a user does something on the White Board or when the user chats with other White Board users, the White Board client sends the action via a command up to the White Board server. The White Board server then relays the command on to the other White Board clients, assuming that the other White Board clients have the correct security privilege to receive and execute the command. Every command is time stamped by the White Board server and contains the action, its privilege, the originating user, machine address, port number, and object specific data sufficient to recreate the same object remotely. In other words, the White Board server time stamps each wrapper object so that the White Board system can afterwards determine when the wrapper object was created and when the wrapper object was modified, and stores a copy of the wrapper object on the White Board server (or at a White Board server specified location). Given that information, it will be appreciated that a complete history may be logged and replayed. It will also be appreciated that each White Board client maintains its own unique copy of the White Board based on the user's maximum privilege.

As discussed above, a user advantageously can reduce his/her privilege level to facilitate communication with lower privileged users without missing data arriving at his/her maximum privilege status. It will be noted that one drawback to this operation would be increased latency. It should be mentioned that the exemplary White Board server 102 goes round robin through it's list of users, checking each user's privilege before deciding whether or not that particular user will receive a wrapper object. A more efficient method of relaying wrapper objects advantageously can be implemented when all users are equal in privilege. In that case, the White Board server would be able to multi-cast to all users, all White Board clients at the same time. See the discussion of FIG. 11. It should be noted here that the White Board system employs reliable network communications via the industry standard TCP/IP socket protocol. This underlying method makes machines re-request data if a packet is lost in transmission. Both White Board clients and the White Board server handshake to guarantee data arrives.

It will be appreciated that the White Board contents can be changed simultaneously by multiple users with one exception. The wrapper around each object allows the White Board system to establish read/write privileges on objects to be displayed on the White Board. The text area object demonstrates this behavior. It permits ONLY the author who placed the text area on the White Board to type text into that particular text area object. All other users who are privileged to view the text area object may read but not modify the text area. In an exemplary case, a green border advantageously can be displayed around writeable text areas while a red border denotes read only text. Optionally, the White Board system can be made to pass write permission tokens around between the various White Board clients. In addition, the White Board system advantageously can provide a view only mode to facilitate teacher (lecture)/student relationships via the White Board system. The White Board system permits such a mode by making a web page with no writeable objects in the selection list available to all of the "students."

As discussed above, the global key name associated with each wrapper object contains information regarding the user and White Board client that created that wrapper object; the object's wrapper also contains the name of the last user to modify the object. Moreover, the White Board server time stamps every change, i.e., every wrapper object, as it arrives from one of the White Board clients or as it is relayed to one of the White Board clients. It is important to note that as commands are issued by respective White Board clients, the White Board server logs the time, the command and the transmitting machine, i.e., computer 300*n*, by address, port, user and security privilege.

Moreover, as previously discussed, each wrapper object, e.g., each object generated by White Board client 301, derives its unique identifier by employing an associated Hash Table. In the exemplary White Board system under discussion, there are three Hash Tables. It will be appreciated that the hashcode derivation is a function provided by Java. Other programming languages provide hashing also.

One Hash Table (named HashVector) contains the position of the object in the vector of objects to be displayed on the White Board client so that, when the user deletes an object from the White Board, this Hash Table associates the object's global key name with the index within the vector so that the vector may be updated to reflect the new appearance of the White Board client. In other words, the White Board client 301 walks through the vector to determine which objects to display in the correct order. For example, the vector ensures that text that is supposed to be in front of a filled oval is not hidden by the filled oval. The White Board client accomplishes this by drawing the filled oval first, and then creating the text following the order employed by the author who created the text.

A second Hash Table (named HashTable) contains the object's Wrapper associated with a global key name known by ALL privileged White Board clients on the network. It will be appreciated that there must be a common name across all White Board clients that uniquely identifies each object on the White Board system. In an exemplary case, global key names are named by the following convention:

DisplayObjectOrigKey=ClientUserId+"."+ClientId+"-"+HashCode

For example, an Oval on one of the White Board clients may be given the global key name, "johndoe.1-123456789," where 123456789 can be any numerical string. This tells the White Board system, and thus all other White Board clients, that user John Doe on White Board client 1 created an object with the Hash Code of its wrapper equal to 123456789. Preferably, the White Board system employs the wrapper's HashCode because not all objects on the White Board can be hashed. An Oval for example, is a bit image in Java; an oval is not an object in the same sense that a button is an object.

Another Hash Table (named HashLocal) contains the object's wrapper associated with the nongraphical object itself. For example, a nongraphical object is a button. A graphical object is an Oval or other bit image drawing. It should be mentioned that JAVA™ does not recognize mouse clicks on graphical objects. The wrapper contains a field with the global key name. However, this global key name is NOT meaningful for the functionality of a user selecting an object at random on the White Board. The local hashcode uniquely identifies an object for each user's White Board client. No two White Board clients will necessarily assign the same hashcode value for the same object, which is the reason why a global key name is also defined.

The following example should facilitate understanding of the HashTable concept and its employment. When a user randomly selects an object on the White Board client, the White Board client looks up the object's wrapper using the local hashcode of the object. When the object is modified, the White Board client extracts the global key name from the object's wrapper and tells all of the privileged White Board clients that the object with that global key name was updated. A remote White Board client privileged to receive the update, will lookup it's copy of the object's wrapper using the global key name, make the update to the object, and then display the change on its White Board.

Referring now to FIGS. 10A–10E, a more detailed discussion of the various tools and corresponding operations for modifying the White Board client 301 will be provided immediately below. It should be mentioned again that certain operations of the White Board will be intuitive to users familiar with graphical user interface (GUI) applications, and a discussion of those features will not be provided in the interest of brevity.

Figure 10A:
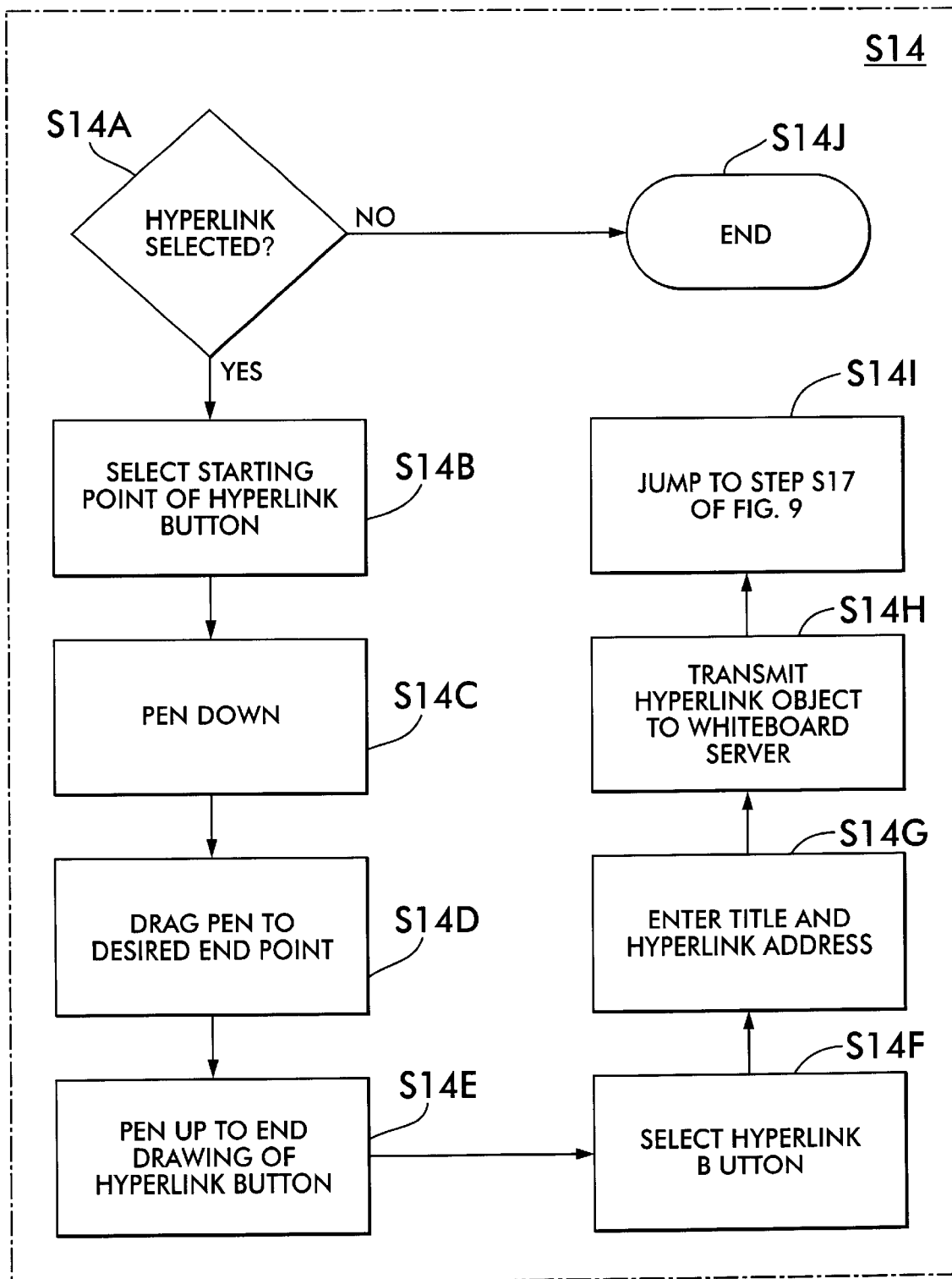
FIGS. 10A, 10B, 10C, 10D, and 10E are flowcharts depicting selected one of the steps producing changes to the White Board client illustrated in FIG. 9A.

Referring specifically to FIG. 10A, in order to use the freehand drawing tool, the White Board client 301 first performs a check at step S11A to determine whether the freehand drawing tool has been selected by the user. See FIG. 7. When the answer is negative, the subroutine S11 ends at step S11H. However, when the answer to the inquiry at step S11A is affirmative, the user selects the starting point for the freehand drawing during step S11B and employs the freehand drawing tool. It should be mentioned that the freehand drawing tool is operated by the steps of executing a pen down operation during step S11C, moving the pen in the desired manner during step S11D, and then executing a pen up operation during step S11E to signify the ending point of the freehand drawing. It should also be mentioned that the terms "pen down" and "pen up" correspond to the more familiar mouse operations of "left click and hold" and "release," respectively. However, since the present invention is not limited to embodiments employing a mouse device, and since the present invention advantageously can be employed with track balls, joy sticks, etc, a more generic terminology is advantageous in describing the preferred embodiments according to the present invention.

From the discussion above, it will be appreciated that step S11C is correct from the user's perspective but is not necessarily correct from the programmer's perspective, which simply points out that the White Board client need not be constructed in a particular manner. In any event, as mentioned above, when the user selects an object in step S11A, a variable is set to store the identity of the selected object. During step S11C, when the user executes a "mouse down" event, the wrapper object created to store the type of object identified by the variable and the White Board client instantiates the object. It will also be appreciated that this discussion applies to corresponding portions of FIGS. 10B–10E.

Still referring to FIG. 10A, completing of step S11E commands the White Board client 301 to transmit the changes to the White Board screen produced by the freehand drawing tool, i.e., a freehand drawing object, to the White Board server 102 running on computer 100. A discussion of the operations of the White Board server 102 responsive to receipt of, for example, the freehand drawing object will be present below in connection with FIG. 11. After transmitting the freehand drawing object, the subroutine S11 jumps to step S17 during step S11G.

Figure 10B:
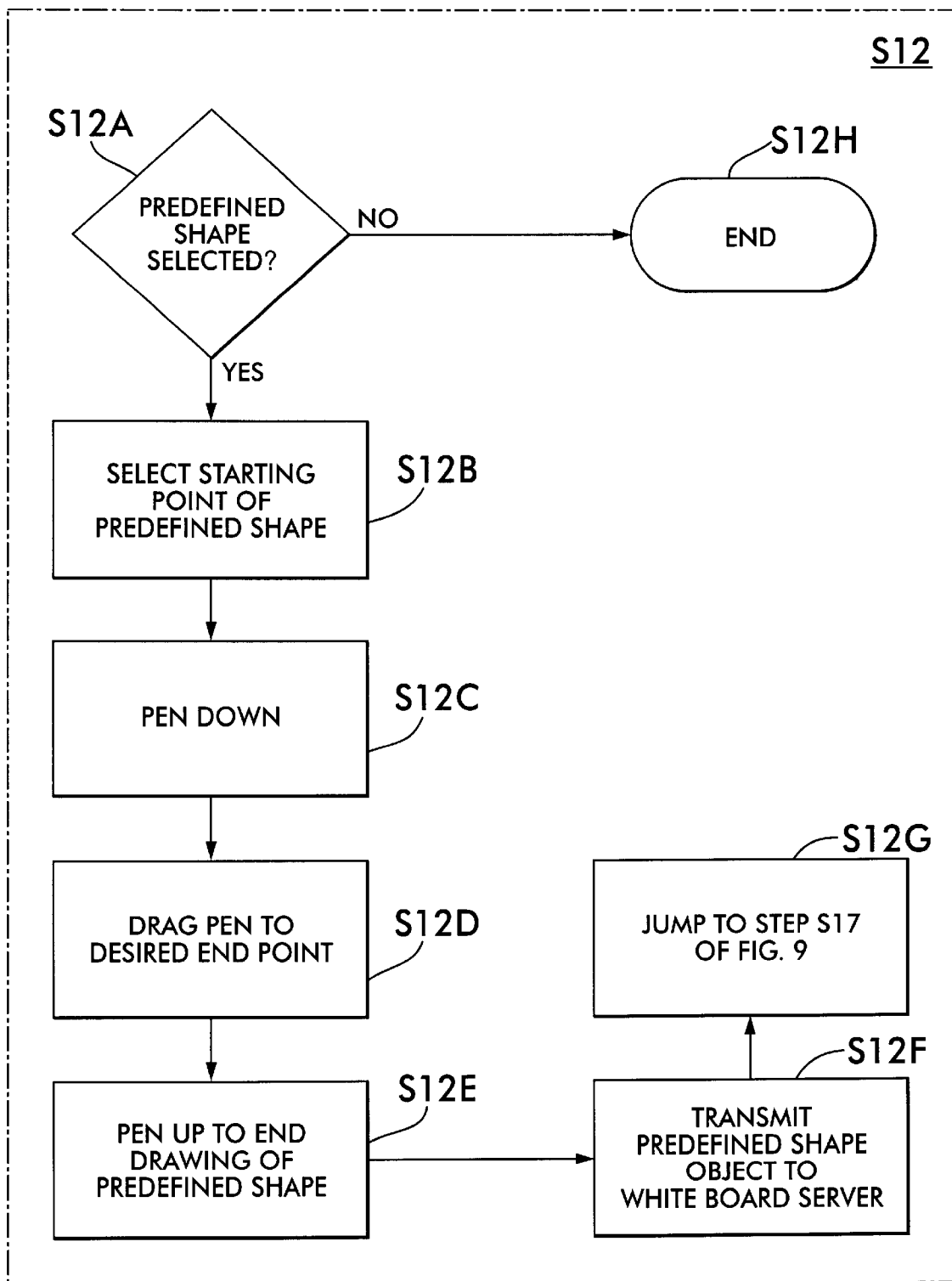

Referring now to FIG. 10B, in order to place predetermined shapes withing the White Board screen, i.e., to operate the object placement tool, the White Board client 301 first performs a check at step S12A to determine whether the object placement tool has been selected by the user. See FIG. 7. When the answer is negative, the subroutine S12 ends at step S12H. However, when the answer to the inquiry at step S12A is affirmative, the user selects the starting point for the predetermined shape, i.e., oval, filled oval, rectangle, or filled rectangle, during step S12B and employs the object placement tool. It will be appreciated that the object placement tool advantageously can place objects such as predefined images in addition to placing simple geometric shapes. It should be mentioned that the object placement tool is operated by the steps of executing a pen down operation at a user selected location during step S12C, moving the pen to another user selected location manner during step S12D, and then executing a pen up operation during step S12E to signify the that the selected predetermined shape should be placed withing a rectangle identified by the two corners of the rectangle specified by the "pen up" and "pen down" operations.

Still referring to FIG. 10B, completion of step S12E commands the White Board client 301 to transmit the changes to the White Board screen produced by the object placement tool, i.e., the user selected predetermined shape, to the White Board server 102 running on computer 100. As previously mentioned, the operation of the White Board server 102 responsive to receipt of the predetermined shape object will be discussed with respect to FIG. 11. After transmitting the predetermined shape object to the White Board client 102, the subroutine S12 jumps to step S17 during step S12G.

Next, the operation of text placement tool(s) in order to place text either on the White Board screen or within a bounded area deposited on the White Board screen will now be described while referring to FIG. 10C. More specifically, the White Board client 301 first performs a check at step S13A to determine whether the text placement tool has been selected by the user. See FIG. 7. When the answer is negative, the subroutine S13 ends at step S13J. However, when the answer to the inquiry at step S13A is affirmative, the subroutine S13 performs another check to determine whether the text is to be deposited at any selected portion to the White Board screen or within a bounded area of the White Board screen designated by the user. Thus, when the answer at step S13B is negative, the subroutine jumps to step S113G. However, when the answer is affirmative, the user selects the starting point for the bounded region, i.e., text-area or text-field, during step S13C and employs the object placement tool. It should be mentioned that the object placement tool is operated by the steps of executing a pen down operation at a user selected location during step S13D, moving the pen to another user selected location manner during step S13E, and then executing a pen up operation during step S13F to signify that the selected type of text box should be placed within a rectangle identified by the two corners of the rectangle specified by the "pen up" and "pen down" operations.

It should be noted here that the text-field is a simple rectangle whereas the text-area includes horizontal and vertical scroll bars. However, each of these bounded regions can accept a virtually unlimited amount of text. Thus, if the user types in more text than readily fits in the text-field, all any user has to do to see all of the text is to select the text-field and scroll through the text using the conventional arrow keys. It will be appreciated that the text-area is more convenient for including large documents. It should also be mentioned that text from a word processing file or the like advantageously can be pasted into either the text-area or text-field via the system clipboard, in the event that the operating system provides such a feature.

Figure 10C:
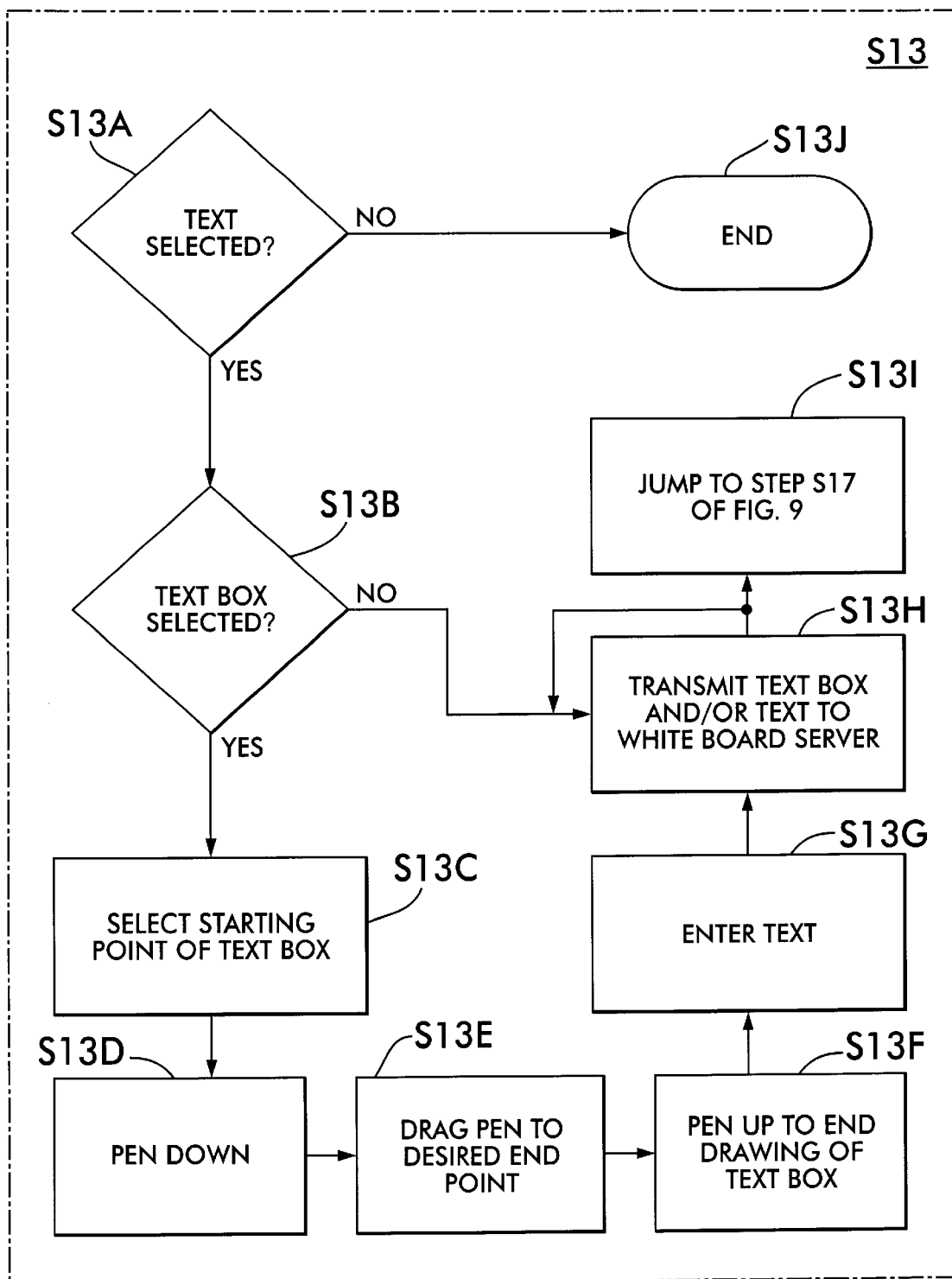

Still referring to FIG. 10C, the user enters text on the White Board screen as a result of a negative answer in step S13B or into the text-area or text-field by virtue of the completion of step S13F. As each character is typed in using keyboard or pasted from the clipboard of computer 300, the White Board client 301 transmits the changes to the White Board screen, i.e., changes to the text object, produced by the text object tool to the White Board server 102 running on computer 100. Again, the operation of the White Board server 102 responsive to receipt of the predetermined shape object will be discussed with respect to FIG. 11. After transmitting the text object to the White Board client 102 at step S13H, a query is performed to determine whether another object has been selected during step S13I. When the answer is affirmative, step S13K is performed, which causes the subroutine S13 jumps to step S17. In the event that the answer is negative at step S13I, subroutine S13 jumps to the start of step S13G, thereby allowing additional text to be entered onto the White Board screen or into a bounded text block on the White Board screen. Thus, the user is permitted to enter text until another object tool is selected.

It should be mentioned that text advantageously can be entered into the text-field or text-area any time the user's pen, e.g., mouse, is positioned to a point inside the bounded text block. It will be appreciated that this permits users to edit text in the bounded text area without the need to generate an additional bounded text block or the need to activate or select a bounded text block, i.e., a text-area, before editing the text appearing therein.

Next, the operation of hyperlink connection tool whereby and active hyperlink is placed with the White Board screen will be described while referring to FIG. 10D. It would be well to note that the term "hyperlink" as used herein need not, but can, refer to a URL specifying a remote web page or remote web site; a hyperlink advantageously can be fabricated to link the existing White Board screen to the URL of a file which is stored on the computer 300 running White Board client 301a. It should also be mentioned that when the hyperlink is operated by one the users, each of the users will be jumped to the URL specified by the hyperlink, or not, depending on the status of the "SURF" box on the users respective White Board.

Figure 10D:
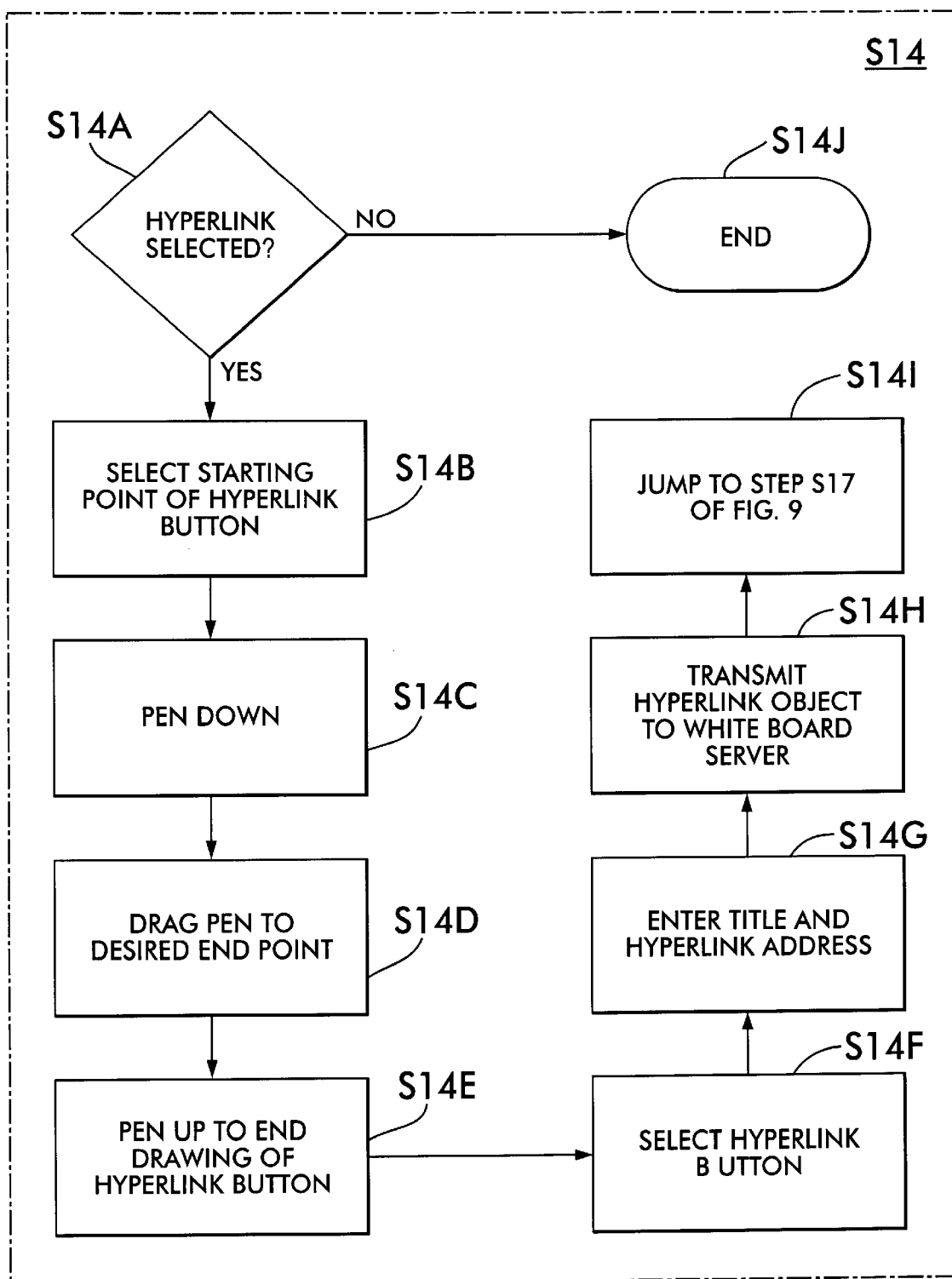

As shown in FIG. 10D, the White Board client 301 first performs a check at step S14A to determine whether the hyperlink connection tool has been selected by the user. See FIGS. 5 and 7. When the answer is negative, the subroutine S14 ends at step S14J. However, when the answer to the inquiry at step S14A is affirmative, the user selects the starting point for the hyperlink button during step S14B and employs the object placement tool. It should again be mentioned that the object placement tool is operated by the steps of executing a pen down operation at a user selected location during step S14C, moving the pen to another user selected location manner during step S14D, and then executing a pen up operation during step S14E to signify that the selected type of object box, i.e., the hyperlink button, should be placed within a rectangle identified by the two corners of the rectangle specified by the "pen up" and "pen down" operations. See FIG. 12D.

Still referring to FIG. 10D, the user selects the hyperlink button on the White Board screen to call up the hyperlink URL assignment box. See 12E. The user then enters a description of the hyperlink and the URL of the hyperlink during step S14G, which ends when the "OK" button on the hyperlink URL assignment box is activated, which produces a White Board screen similar to that illustrated in FIG. 12F. It should be noted that the hyperlink is now active; selecting the hyperlink button illustrated in FIG. 12F results in the retrieval of the web page, or the like, specified by the unique URL assigned to the hyperlink, as shown in FIG. 12G. Again, the White Board client 301 transmits the information produced by the hyperlink connection tool to the White Board server 102 running on computer 100 during step S14H. Again, the operation of the White Board server 102 responsive to receipt of the hyperlink object will be discussed with respect to FIG. 11. After transmitting the hyperlink object to the White Board client 102, step S14I is performed, which causes the subroutine S14 jumps to step S17.

Figure 10E:
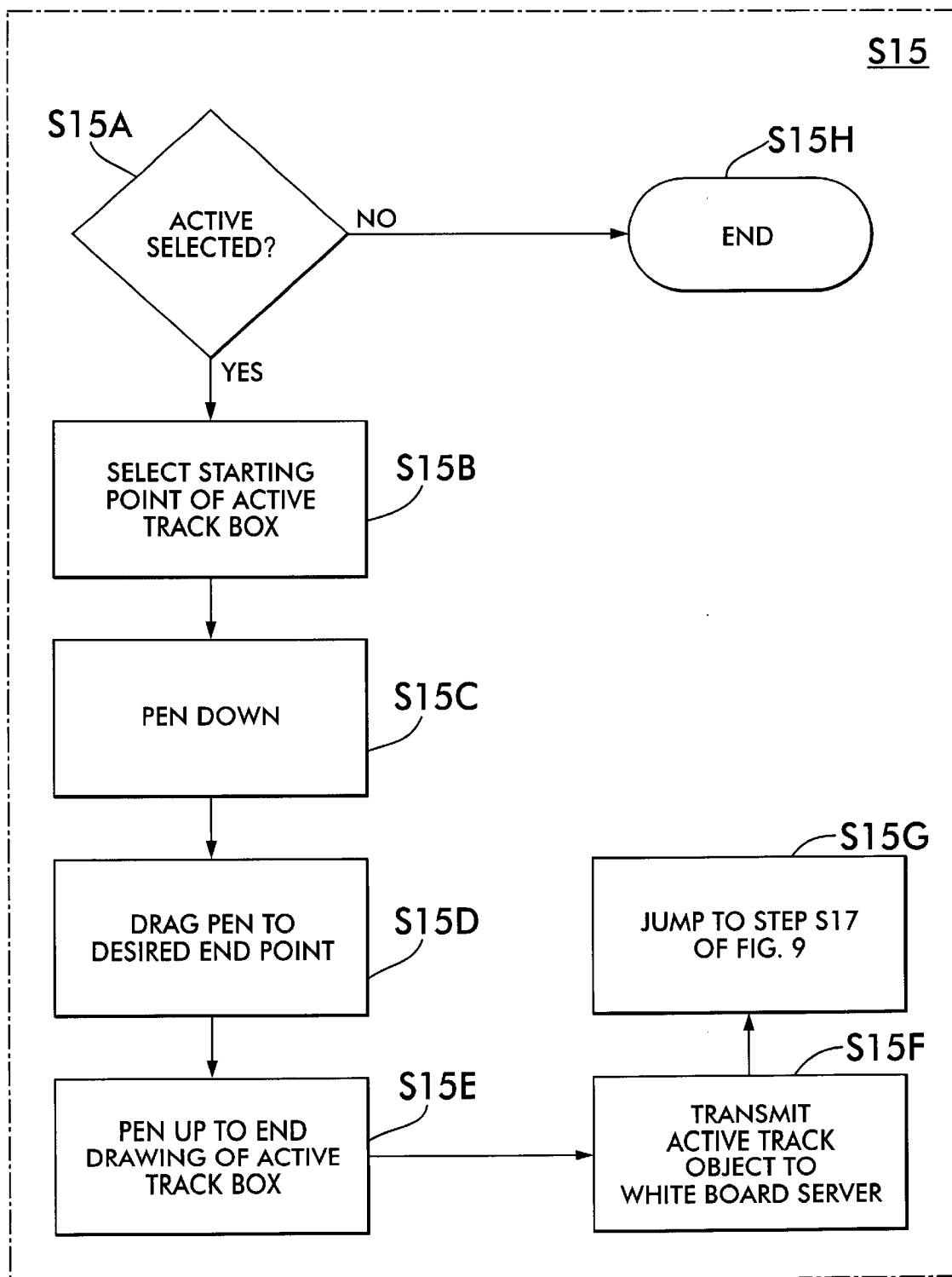

Referring now to FIG. 10E, in order to place and hook an active track object within the White Board screen, i.e., to operate the track object tool, the White Board client 301 first performs a check at step S15A to determine whether the track object tool has been selected by the user. See FIG. 7. When the answer is negative, the subroutine S15 ends at step S15H. However, when the answer to the inquiry at step S15A is affirmative, the user selects the starting point for the active track object during step S15B and employs the object placement tool. It will be appreciated that the object placement tool advantageously can place objects such as predefined images, as discussed in greater detail above, in addition to placing track objects. It should again be mentioned that the object placement tool is operated by the steps of executing a pen down operation at a user selected location during step S15C, moving the pen to another user selected location manner during step S15D, and then executing a pen up operation during step S15E to signify the that the track object should be placed withing a rectangle identified by the two corners of the rectangle specified by the "pen up" and "pen down" operations.

Still referring to FIG. 10E, completion of step S15E commands the White Board client 301 to transmit the changes to the White Board screen produced by the object placement tool, i.e., the track object, to the White Board server 102 running on computer 100. As previously mentioned, the operation of the White Board server 102 responsive to receipt of the predetermined shape object will be discussed with respect to FIG. 11. After transmitting the predetermined shape object to the White Board client 102, the subroutine S15 jumps to step S17 during step S15G.

The operation of the White Board server will now be described while referring to FIG. 11, which illustrates the operation of White Board server 102 receiving both objects defined by White Board client 301*a* and an active track generated by computer 200*a* via LAN 400. In the illustrated example, the White Board server 102 attempts to transmit the object and the active track to White Board clients 301*b* and 301*c*, also via LAN 400.

Figure 11:
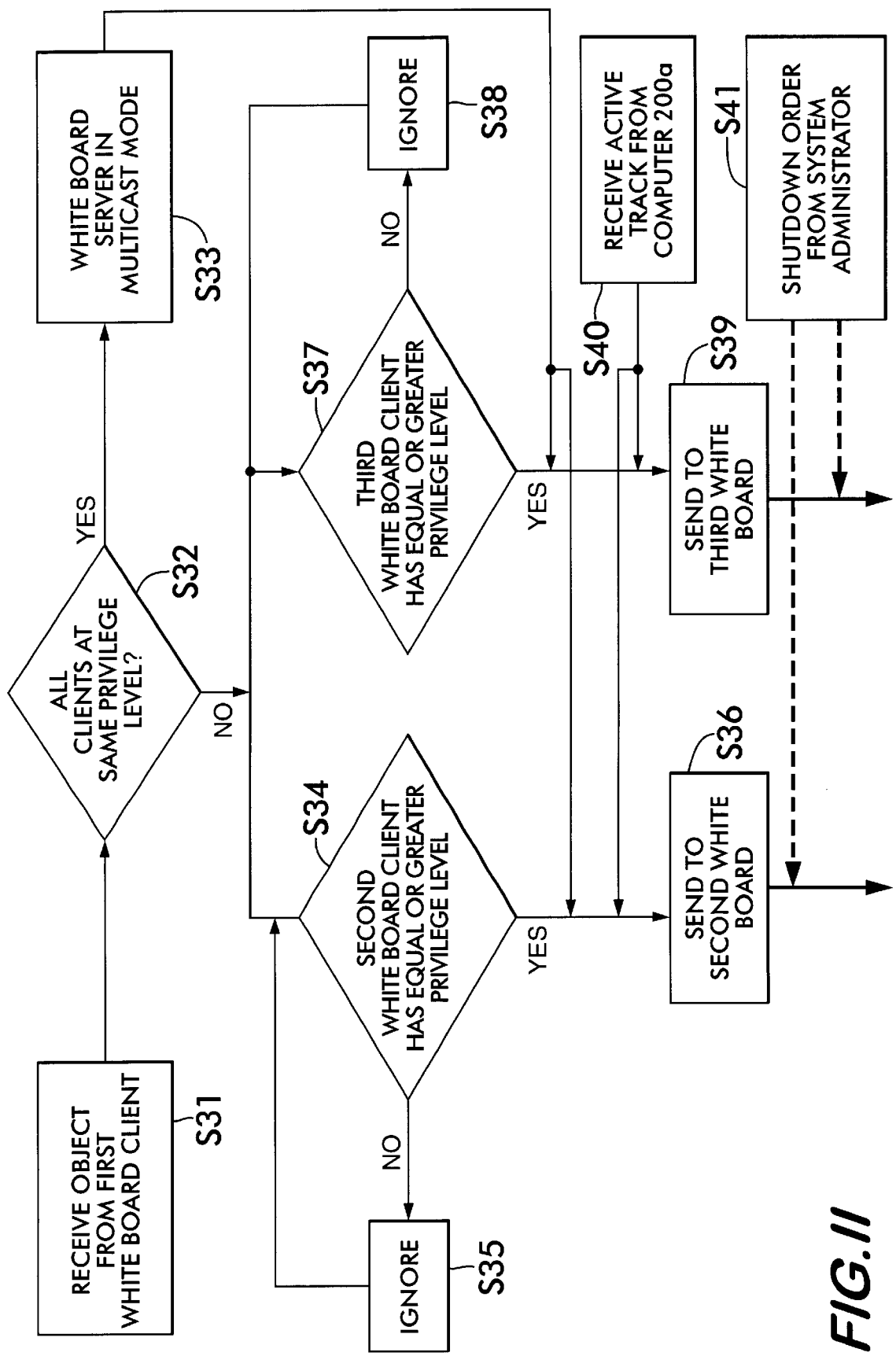
FIG. 11 is a high level flowchart depicting various operations of the White Board server according to the present invention.
Figure 12B:
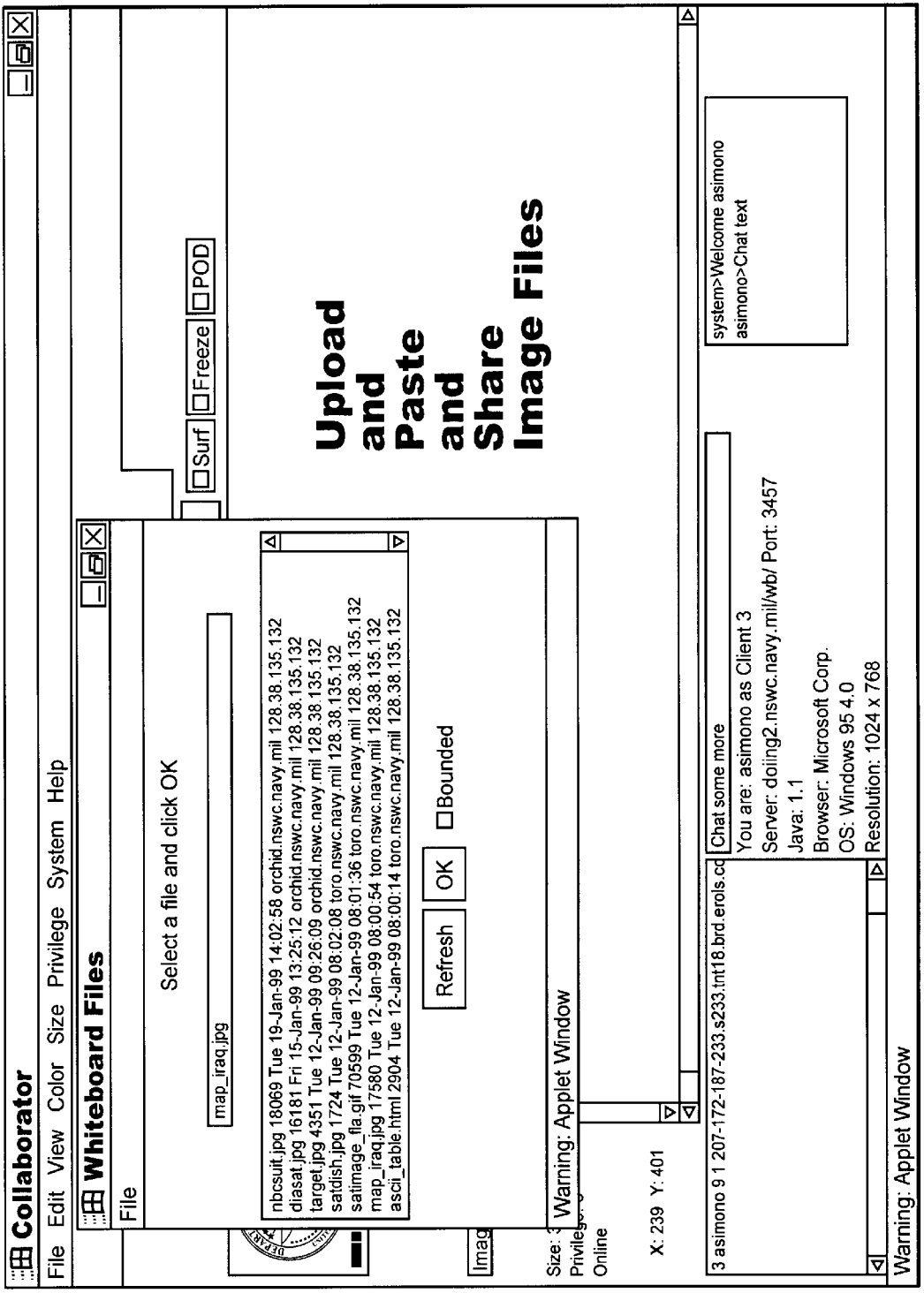
Figure 12C:
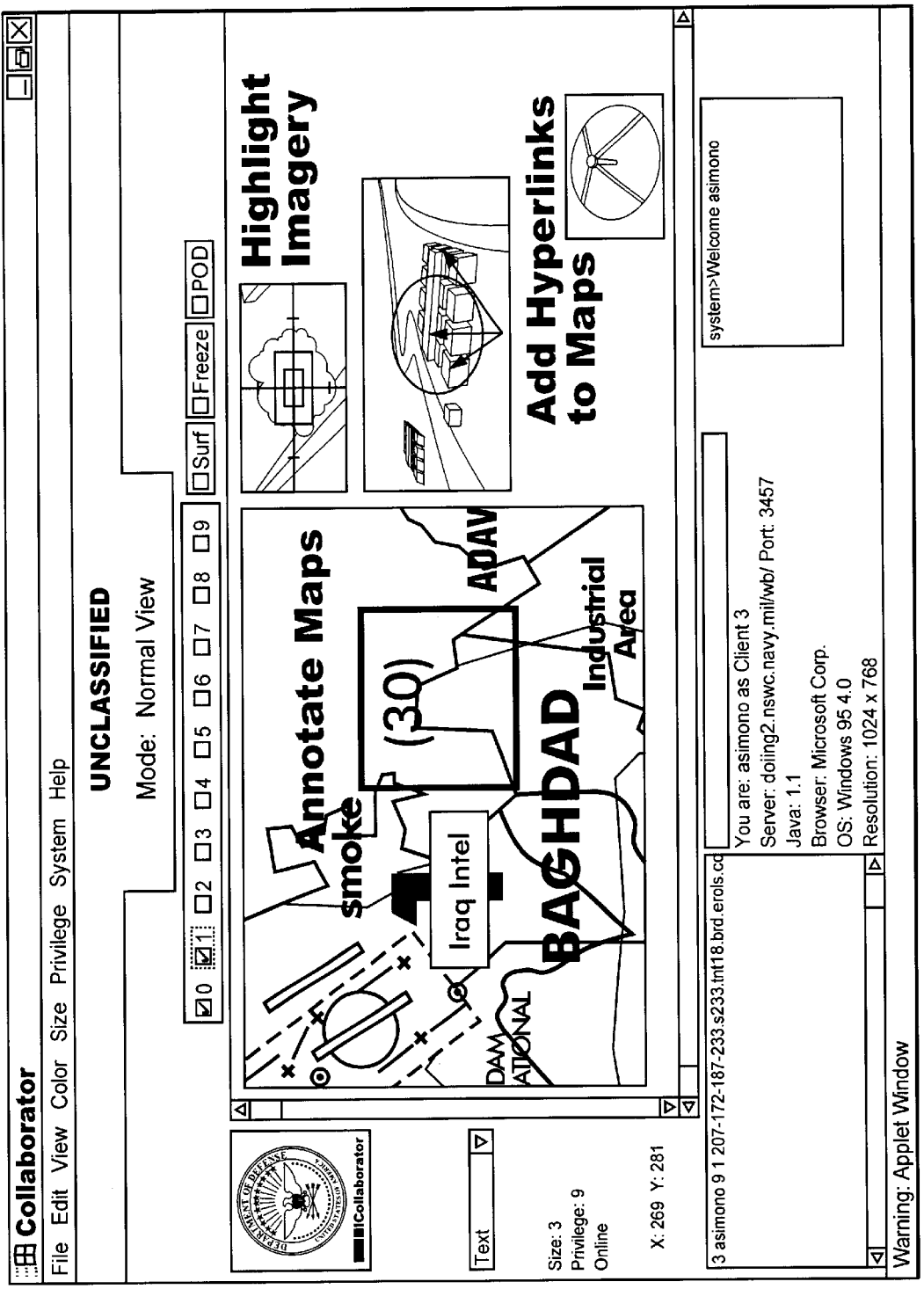
Figure 12D:
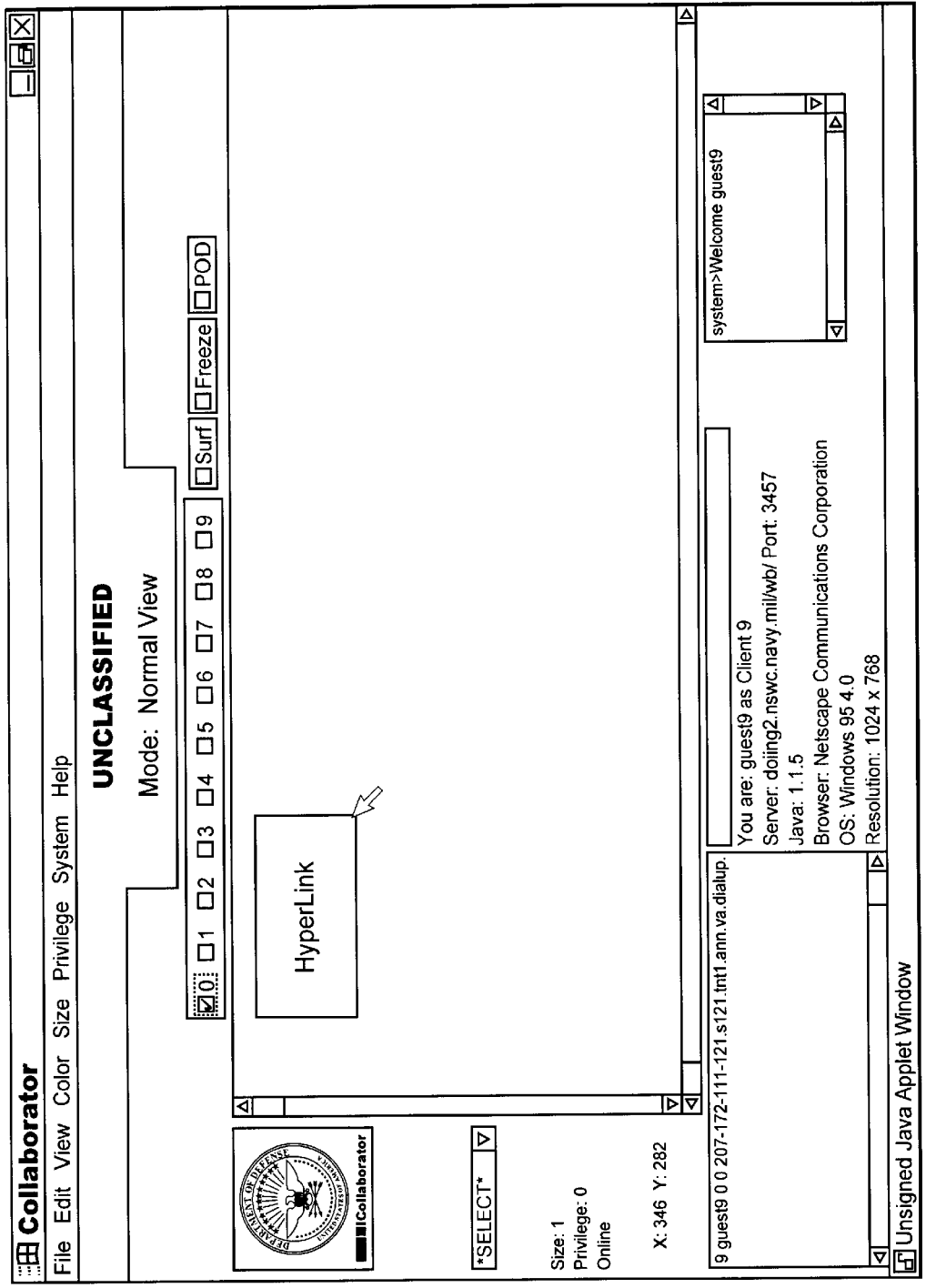
Figure 12F:
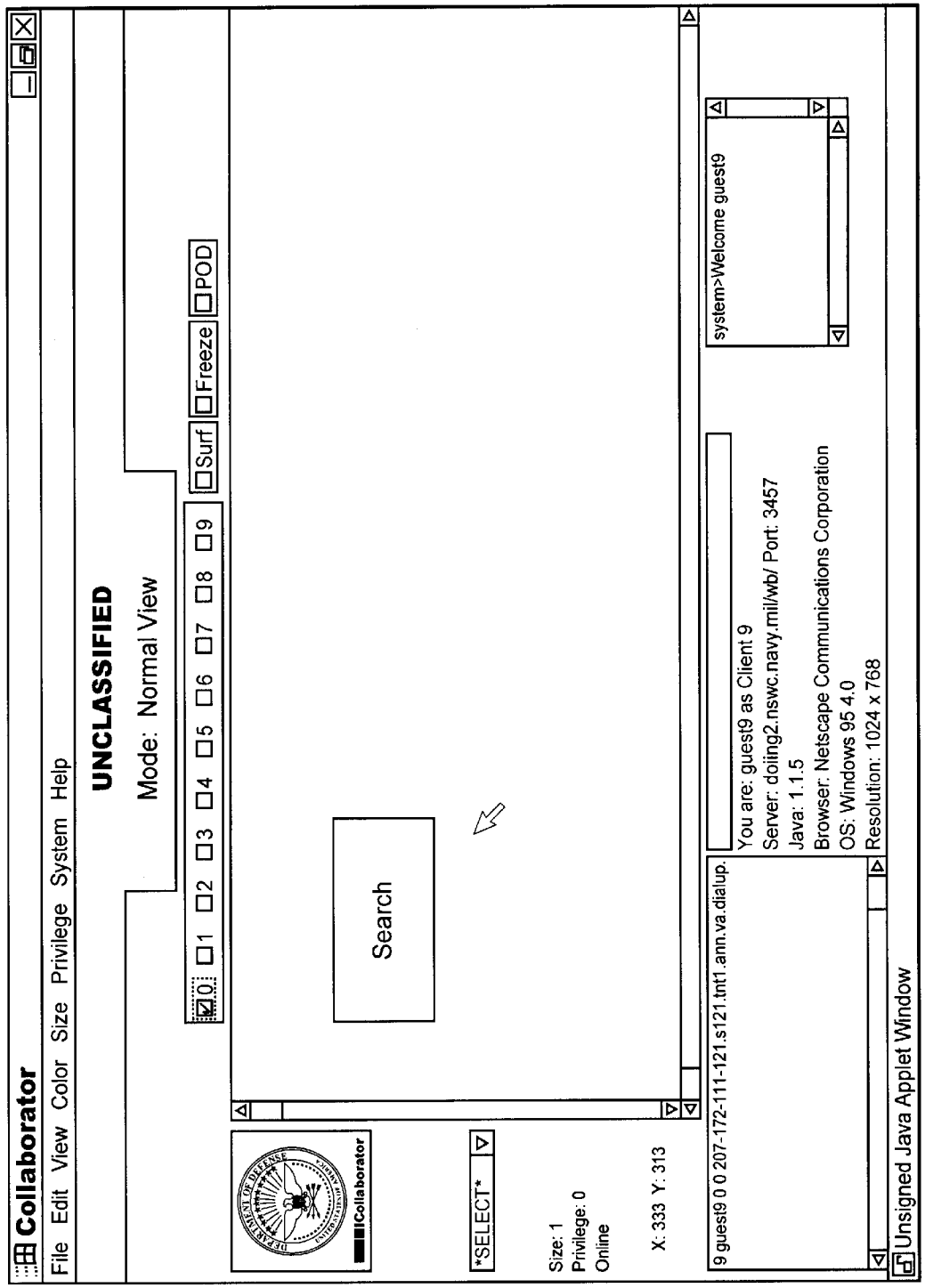
Figure 12G:
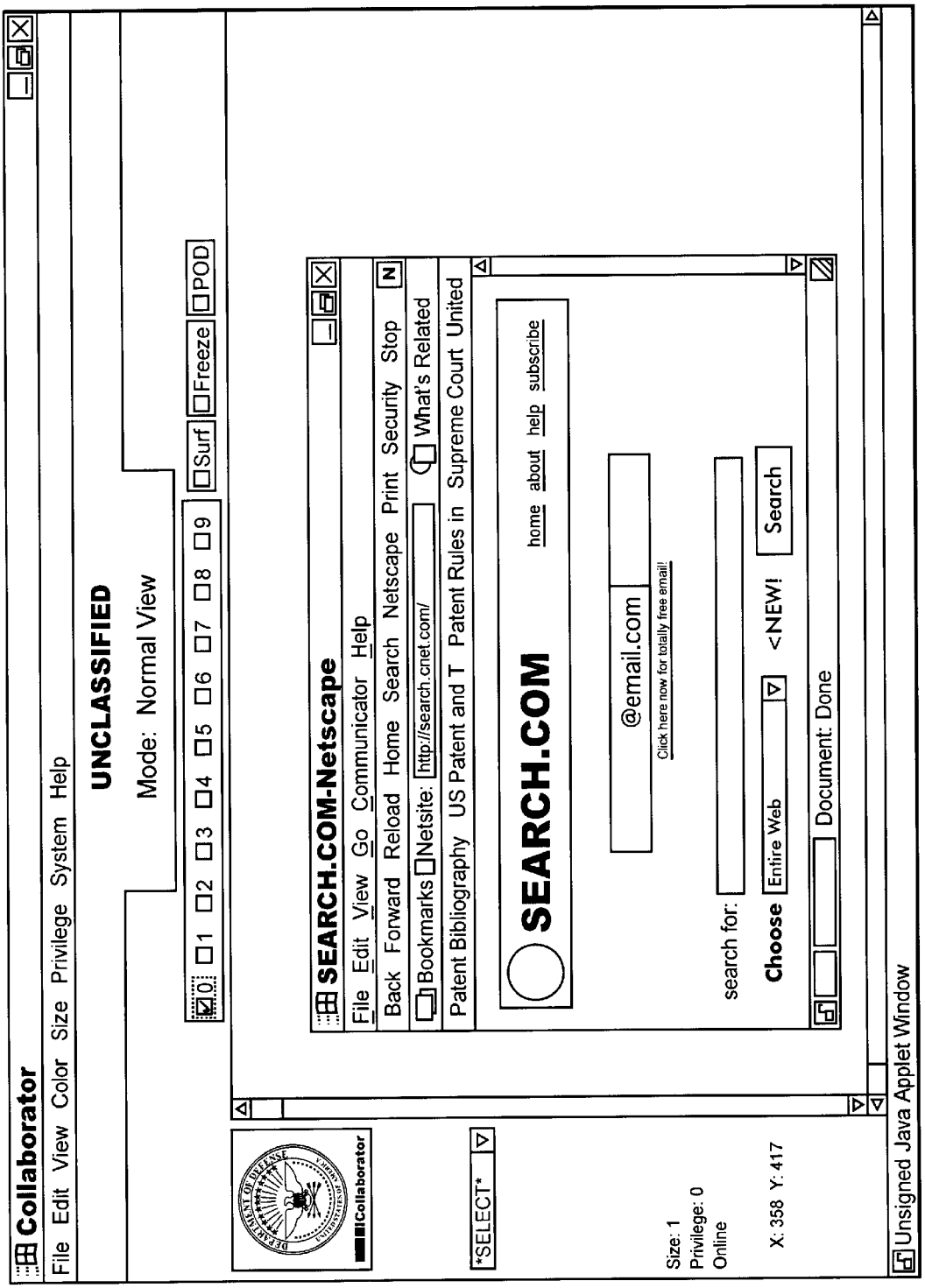
Figure 12H:
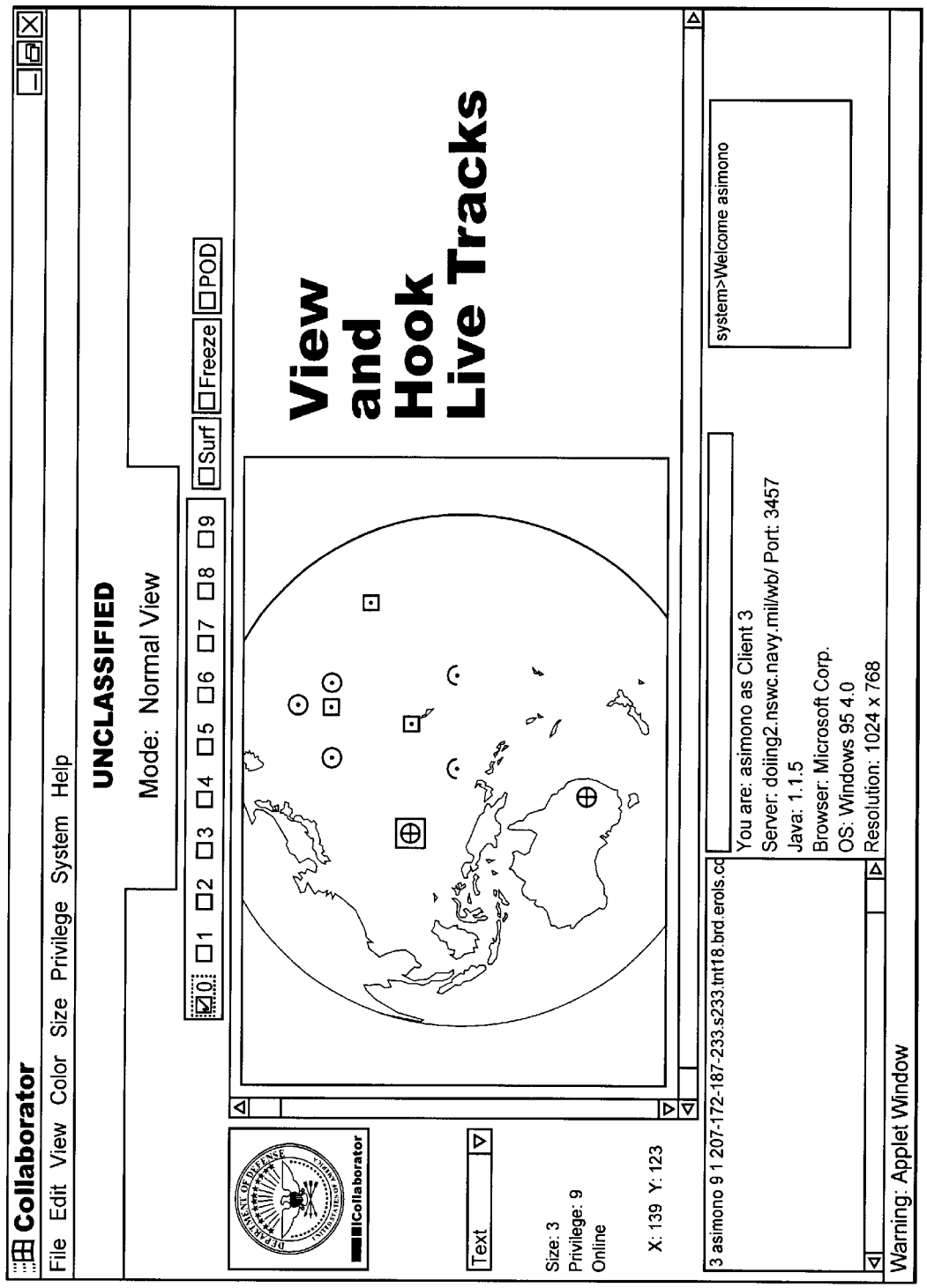

Referring specifically to FIG. 11, the White Board server 102 advantageously receives the object transmitted by White Board client 301*a* running on computer 300*a* during step S31. It should be noted that the objects received during step S20 advantageously can be any or all of the objects discussed with respect to FIGS. 10A–10E. A check is then performed during step S32 to determine whether all of the White Board clients, e.g., White Board clients 301*a*, 301*b* and 301*c*, have the same privilege level. When the answer is affirmative at step S32, the White Board server 102 advantageously can shift to a multi-cast mode of operation during step S33 and relays the object to White Board clients 301*b* and 301*c* by simultaneously performing steps S36 and S39.

When the answer at step S32 is negative, the White Board server 102 performs a check at step S34 to determine whether the object(s) to be transmitted to White Board client 301*b* has a privilege level less than or equal to the privilege level assigned to White Board client 301*b*. When the answer at step S34 is negative, the routine jumps to step S35, wherein the object is indicated as being ignored and the routine loops back to the beginning of step S34 to await the next object. In the event that the answer is affirmative, the received object is then transmitted to the active port corresponding to respective White Board client 300*b* during step S36.

Moreover, when the answer at step S32 is negative, the White Board server 102 performs a check at step S37 to determine whether the object(s) to be transmitted to White Board client 301*c* has a privilege level less than or equal to the privilege level assigned to White Board client 301*c*. When the answer at step S37 is negative, the routine jumps to step S38, wherein the object is indicated as being ignored and the routine loops back to the beginning of step S37 to await the next object. In the event that the answer is affirmative, the received object is then transmitted to the active port corresponding to respective White Board client 300*c* during step S39.

Still referring to FIG. 11, the generated object server 103 receives an object, e.g., active track information, from computer 200*a* during step S40. It should also be noted that the active track information advantageously can be either an active track image itself or update information for an established active track object. In any event, the received object is then transmitted to the active ports corresponding to respective White Board clients 300*b* and 301*c* during steps S36 and S39.

It should be mentioned that the object with too high a privilege, i.e., a secret object being transmitted to a White Board server 301*b* with a confidential classification, can be treated in any number of ways to ensure that the object is not transmitted to the White Board server 301*a*. All of these methods, e.g., flagging the object, can be collectively termed security filtering. It should also be mentioned that the chat function, which allows all of the White Board clients to send real time text to all connected clients, advantageously can be security filtered as well. This latter feature of the White Board system permits selected individuals such as instructors or observers or exchange comments, which comments will not be perceived by the trainees, since the trainees will not have an "instructor" privilege level.

It should also be mentioned that step S41 advantageously can be executed by the system administrator connected to the White Board server 102 to selectively transmit a "kill" command to one or more of the White Board clients 301*a*, 301*b* or 301*c*, as discussed in greater detail above.

Although the present invention has been discussed in terms of the JAVA™ programming language, it will be appreciated that other programming languages advantageously may be employed. For example, the White Board client advantageously can be written in the Python programming language and executed via a Python interpreter, i.e., the choice of the JAVA™ programming language is completely arbitrary. Any architecture independent supported language, such as Python, could be used. A common embodiment of the White Board client is as an applet because of the readily available World Wide Web browser Hypertext Markup Language (HTML) interface. It will also be appreciated that the White Board client may be provided by dedicated integrated circuits or programmable logic devices instead of software.

Thus, the White Board system and corresponding operating method provide the environment for users operating on diverse hardware platforms and/or divergent operating systems to collaborate with one another, i.e., the White Board on any commercial off the shelf (COTS) based display console. In addition, the White Board system and corresponding method according to the present invention permit server-based applications to be simultaneously presented on COTS systems, e.g., Windows-based PCs, Silicon Graphics Incorporated (SGI) Unix workstations, etc.

In summary, the White Board system according to the present invention provides the following functionality, either alone or in combination. First, the White Board system crosses Unix/Windows boundaries. Moreover, the White Board system runs cross platform without porting or recompiling. It should be noted that the White Board is graphical in context, much like a painting program. Since the White Board system is web based, the White Board system links to objects via the industry standard HTTP protocol. Additionally, since the White Board client is accessed via a web page, the web page advantageously can provide a list of drawable items, which list may be customized using any HTML or text editor.

Furthermore, the White Board system filters both objects and chat text according to assigned privilege. Moreover, the White Board system provides for user logging, i.e., each user must log in to the White Board system, by which mechanism each White Board client advantageously can be uniquely identified. This feature of the White Board system allows users to join an established group session while identifying the new group participant to all other group members. Since the White Board system guarantees traceability, each new user logging in advantageously can have his/her White Board updated via the White Board server. As discussed in detail above, this feature also permits the system administrator to control the users logged into the White Board system, i.e., the White Board server. This feature also permits the system administrator to issue a "kill"

command to selected White Board clients to thereby force the selected White Board clients offline.

Moreover, since each White Board client is logged into the White Board server, and since the White Board server includes a filtering function, multiple white board drawing rooms advantageously are supported by a single White Board server. Stated another way, each White Board client advantageously may have an identifier, a privilege level, and a group association assigned by the White Board server 102. In that event, the White Board server relays objects to White Board clients having an identical group association by performing a second level filter operation (not shown) in additions to the security filtering performed in steps S34 and S37.

Advantageously, the White Board system according to the present invention provides active moving content display and active hyperlinks. Since all of the individual components displayed on the White Board screen advantageously can be active, it will be appreciated that the White Board system provides active GUIs. Alternatively, the White Board client can display third-party JAVA objects by invoking the appropriate API. The White Board client advantageously includes multiple, user-selectable display layers, which permits each user to filter off drawing objects to thereby simplify the White Board screen being displayed.

The White Board system advantageously includes a specialized White Board server to support White Board functionality. For example, the White Board server provides data logging and stores white board data, i.e., data on all relayed objects. This storage capability permits the user or system administrator to save the White Board session for later playback and/or critiquing. The White Board sever advantageously permits users to upload and retrieve centrally held JAVA objects and images. It should be mentioned that multiple White Board servers can be operated simultaneously, which provides the White Board system the ability to "fail over" to a back up White Board servers if the primary White Board server fails.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A White Board system permitting a plurality of users to collaborate with one another irrespective of the respective user's hardware platform or operating system, comprising:
   a server computer; and
   a plurality of client computers coupled to said server computer;
   wherein:
      each of said client computers logs into said server computer and is thereby assigned a unique identifier;
      each of said client computers includes a graphical user interface (GUI) which selectively displays any combination of objects having active content, active hyperlinks, and text;
      each of said client computers transmits user-generated objects to said server computer for storage and selective retransmission to said client computers;
      said server stores all user-generated objects from all said client computers;
      said server selectively controls transmission of all user-generated objects to respective ones of said computers responsive to the respective assigned identifier.

2. The White Board system as recited in claim 1, wherein said server computer and said client computers are electrically coupled to one another via a local area network (LAN).

3. The White Board system as recited in claim 1, wherein said server computer runs a Web Server and wherein each of said client computers runs a Web browser client.

4. The White Board system as recited in claim 1, wherein said server computer runs a Web Server distributing both a web page including a White Board client applet tag and the White Board client applet and wherein each of said client computers runs a Web browser client which automatically executes said White Board client applet when the White Board client applet has been transferred from said server computer.

5. A White Board system permitting a plurality of users to collaborate with one another irrespective of the respective user's hardware platform or operating system, comprising:
   a primary server computer; and
   a plurality of client computers coupled to said primary server computer, each of said client computer having a respective privilege level and each of said client computers being operatively connected to said primary server computer;
   wherein:
      each of said client computers transmits user-generated objects to said primary server computer;
      said primary server stores all of said user-generated objects transmitted from said client computers; and
      said primary server selectively transmits said user-generated objects to respective ones of said computers responsive to the respective privilege level.

6. The White Board system as recited in claim 5, further comprising a secondary server computer, wherein all of said client computers disconnect from said primary server computer and reconnect to said secondary server computer when said primary server computer is unavailable.

7. The White Board system as recited in claim 5, wherein each of said client computers has a respective privilege level and a respective group association, and wherein said primary server selectively transmits said user-generated objects to respective ones of said computers responsive to the respective privilege level and the respective group association.

8. The White Board system as recited in claim 5, wherein said primary server computer further comprises memory which stores files one of uploaded from and downloaded to at least one of said client computers.

9. The White Board system as recited in claim 5, wherein each of said client computers display a predetermined graphical user interface (GUI).

10. The White Board system as recited in claim 5, wherein said primary server computer is operatively connected to and object source providing a predetermined object and wherein said primary sever computer selectively transmits said predetermined object to said client computers responsive to the respective privilege level.

11. The White Board system as recited in claim 10, wherein said predetermined object varies over time.

12. The White Board system as recited in claim 5, wherein said primary server multicasts said user-generated objects to all of said computers when the respective privilege level of all of said client computers are identical.

13. A White Board system permitting a plurality of users to collaborate with one another irrespective of the respective user's hardware platform or operating system, comprising:
   a first client computer which instantiates first objects having a first privilege level;

a second client computer which instantiates second objects having a second privilege level; and a server computer operatively coupling said first and said second computers, said server computer comprising:
   a memory for storing all of said first and said second objects; and
   a filter which selectively relays said first and said second objects between said second and said first client computers, respectively, responsive to said first and said second privilege levels.

14. The White Board system as recited in claim 13, wherein each of said first and said second computers includes a display which displays relayed ones of said first and said second objects.

15. The White Board system as recited in claim 13, wherein said memory stores said first and said second objects based on time of receipt of said first and said second objects.

16. The White Board system as recited in claim 13, wherein one of said first and said second objects comprises an active hyperlink.

17. The White Board server as recited in claim 13, wherein said server computer receives a series of objects representing a moving object and relays said series of object to said first and said second client computers.

18. The White Board system as recited in claim 13, wherein said series of objects is not stored in said memory and wherein said series of object does not pass through said filter.

19. The White Board system as recited in claim 13, wherein:
   said first objects have a first privilege level and a first identifier;
   said second objects have said second privilege level and a second identifier;
   said filter is a first filter; and
   said server computer further comprises a second filter which selectively relays said first and said second objects between said second and said first client computers, respectively, responsive to said first and said second identifiers.

20. The White Board system as recited in claim 13, wherein each of said first and said second client computers further comprises a tool for modifying a user-selected one of said first and said second objects residing on the respective client computer.

* * * * *